US007819164B2

(12) United States Patent
Matsushita

(10) Patent No.: US 7,819,164 B2
(45) Date of Patent: Oct. 26, 2010

(54) TRANSFER TOOL

(75) Inventor: Kinya Matsushita, Osaka (JP)

(73) Assignee: Kokuyo Co., Ltd., Osaka-shi (JP)

( * ) Notice: Subject to any disclaimer, the term of this patent is extended or adjusted under 35 U.S.C. 154(b) by 972 days.

(21) Appl. No.: 10/572,942

(22) PCT Filed: Apr. 26, 2005

(86) PCT No.: PCT/JP2005/007934

§ 371 (c)(1),
(2), (4) Date: Nov. 29, 2006

(87) PCT Pub. No.: WO2005/108261

PCT Pub. Date: Nov. 17, 2005

(65) Prior Publication Data

US 2007/0098462 A1 May 3, 2007

(30) Foreign Application Priority Data

May 6, 2004 (JP) ............................. 2004-137883
Dec. 27, 2004 (JP) ............................. 2004-378115

(51) Int. Cl.
*B32B 37/26* (2006.01)
*B26F 3/02* (2006.01)
*B43L 19/00* (2006.01)

(52) U.S. Cl. ........................ 156/577; 156/574; 156/579

(58) Field of Classification Search ................. 156/574, 156/577, 579; 118/207
See application file for complete search history.

(56) References Cited

U.S. PATENT DOCUMENTS 4,345,966 A * 8/1982 Iiyama et al. ............... 156/523
4,775,084 A 10/1988 Morikami et al.
5,207,860 A 5/1993 Klaassen et al.
5,316,613 A 5/1994 Samuelson et al.
5,326,421 A * 7/1994 Taylor ........................ 156/526
6,601,630 B2 * 8/2003 Kang ......................... 156/574

(Continued)

FOREIGN PATENT DOCUMENTS

JP 53-2385 1/1978

(Continued)

OTHER PUBLICATIONS

International Search Report of PCT/JP2005/007934 dated Jun. 21, 2005.

(Continued)

*Primary Examiner*—Mark A Osele
(74) *Attorney, Agent, or Firm*—Westerman, Hattori, Daniels & Adrian, LLP

(57) ABSTRACT

To provide a transfer tool which realizes both of a mode of transferring a transferring object of any dimension and a mode of continuously transferring the transferring object by a certain dimension, there is provided an operating part (7) which functions as a feeding mechanism (X) for feeding a paper (P) by a certain dimension in a counter-transfer direction by rotating an auxiliary roller (R1) in a use state (O) and a switching mechanism (Z) for selectively switching a feeding state (x) by the action by the feeding mechanism (X) and a normal use state (y) where the feeding state (x) is released still in the use state (O).

32 Claims, 14 Drawing Sheets

U.S. PATENT DOCUMENTS

| | | | | |
|---|---|---|---|---|
| 6,748,993 | B1 * | 6/2004 | Shinozaki et al. | 156/391 |
| 7,204,287 | B2 * | 4/2007 | Casaldi et al. | 156/523 |
| 2002/0033238 | A1 * | 3/2002 | Downs | 156/577 |

FOREIGN PATENT DOCUMENTS

| | | | |
|---|---|---|---|
| JP | 58-31857 | | 2/1983 |
| JP | 62-164268 | | 10/1987 |
| JP | 11-59076 | A | 3/1999 |
| JP | 2000-247095 | | 9/2000 |
| JP | 2002-264588 | A | 9/2002 |

OTHER PUBLICATIONS

Canadian Office Action dated Jul. 8, 2008, issued in corresponding Canadian Patent Application No. 2,539,875.

* cited by examiner (a)

(b)

(c)

(d)

(a)

(b)

(a)

(b)

(a)

(b)

TRANSFER TOOL

TECHNICAL FIELD

The present invention relates to a transfer tool used when a transferring object is transferred on a transferred surface.

BACKGROUND ART

Various transfer tools used when a transferring object is transferred on a transferred object have been conventionally devised. The transferring objects include tapes such as adhesive tapes and non-adhesive tapes, solid and liquid glues and adhesives. A conventional transfer tool for transferring such transferring objects generally includes a transfer tool main unit which holds the transferring object therein and a transfer head for sending the transferring object held in the transfer tool main unit to the transferred object. A transfer face which comes in contact with the transferred surface to transfer the transferring object to the transferred surface is formed on the transfer head. That is, the conventional transfer tool is configured so as to transfer the transferring object on the transferred surface by continuously moving the transfer tool main unit on the transferred surface in the state where the user holds the main unit in his/her hand and the transfer face is in contact with the transferred surface.

On the other hand, a transfer tool disclosed in Patent document 1 allows the transfer face to be pressed onto the transferred surface with the transferring object being exposed on the transfer face by a certain dimension, thereby transferring the transferring object on the transferred surface by the certain dimension each time pressing operation is performed.

Patent document 1: Japanese Unexamined Patent Publication No. 2002-264588

DISCLOSURE OF THE INVENTION

Problems to be Solved by the Invention

In the above-mentioned conventional transfer tool, when the transferring object is transferred on the transferred object, the transfer dimension of the transferring object is arbitrarily determined by simply making an adjustment of the transfer tool main unit by hand to move the transfer tool main unit, and however, there may be a case where the transferring object cannot be accurately transferred by the certain dimension, for example, when the transferring object is to be transferred at a predetermined position by the certain dimension. Furthermore, when the transfer face of the transfer head is moved on the transferred surface from a end part of a paper or its periphery in the contact state, generally, the transfer face is pressed to the end part while the vicinity of the transferred position is held by hand to move the transfer tool main unit, and in the case where a thin paper is used as the transferred object at this time, the transferred object can be broken by the force of pressing the vicinity of the end part of the transferred object with a hand and the force of moving the transfer face in a predetermined transfer direction.

On the other hand, when the transfer tool described in Patent document 1 is used, the transferring object can be accurately transferred by a predetermined dimension by pressing the transferring object onto the transferred object with the transferring object being exposed by the certain dimension. However, when the transferring object is transferred by an arbitrary dimension using the transfer tool, the pressing operation for transferring the transferring object by the certain dimension must be intermittently repeated, resulting in a substantial reduction in the operating efficiency in transferring the transferring object.

In consideration with these disadvantages, the present invention provides a transfer tool which realizes both of a mode of transferring the transferring object by any dimension and a mode of continuously transferring the transferring object by a certain dimension.

Means for Solving Problems

To achieve such object, the present invention adopts the following means. That is, a transfer tool according to the present invention is characterized by that A transfer tool used when a transferring object is transferred on a transferred object such as a paper comprising: a transfer tool main unit having at least a transfer head capable of bringing the transferring object into contact with the transferred object, the transfer head having a transfer face which comes into contact with the transferred object and on which the transferring object is transferred at the transfer of the transferring object on the transferred object, wherein in a normal use state, the transferring object is transferred on the transferred object by brining the transfer face into contact with the transferred object and moving the transfer face in a predetermined transfer direction, the transfer tool including a feeding mechanism for feeding the transferring object to the transferred object by a certain dimension through the transfer face in the state where the transfer face is stopped and pressed with respect to the transferred object and a switching mechanism for selectively switching between a feeding state by the action of the feeding mechanism and the normal use state where the feeding state is released in the state where the transfer face is in contact with the transferred object.

In this specification, “transfer direction” refers to a direction in which the transfer face is moved to the transferred object to transfer the transferring object. With such configuration, since the transfer tool according to the present invention can continuously switch between a mode of transferring the transferring object by a certain dimension by the feeding mechanism and a mode of transferring the transferring object of any dimension by using the switching mechanism, even in the feeding state where the transferring object can be transferred by the certain dimension using the feeding mechanism, the switching mechanism selectively switches from the feeding state to the normal use state in the state where the transfer face is pressed to the transferred object, and thus, as in the conventional transfer tool, it is possible to arbitrarily switch to the mode of transferring the transferring object of any dimension without leaving the transfer face from the transferred object. Furthermore, in the conventional transfer tool, for example, when a thin paper is used as the transferred object, the transferred object can be broken by the force of pressing the vicinity of the end part of the transferred object with a hand and the force of moving the transfer face in a predetermined transfer direction. However, by using the transfer tool according to the present invention, the transferring object can be transferred on the transferred object by the certain dimension using the feeding mechanism and even when a thin paper is used as the transferred object, the transferring object can be stably transferred without braking the paper.

To further reduce a force exerted on the transferred object when the transfer face is moved in the transfer direction to realize smooth transfer, it is desirable that the transfer head has a transfer roller with the transfer face capable of rotating at the transfer.

To configure the above-mentioned feeding mechanism in which the force exerted on the transferred object is reduced when the transfer face is moved in the transfer direction to transfer the transferring object by the certain dimension, the feeding mechanism can feed the transferring object to the transferred object by the certain dimension by rotating the transfer roller by a certain angle due to an external force. Furthermore, in the case of adopting the above-mentioned feeding function, it is desirable that the switching mechanism switches between the feeding state where the transfer roller can be rotated by the certain angle depending the feeding mechanism and the normal use state where the transfer roller can rotate without depending on the feeding mechanism.

To obtain good transfer property by properly bringing the transfer face into contact with the transferred object and accurately send the transferred object in the counter-transfer direction, it is desirable to provide a rotatable auxiliary roller having a backing face which comes into contact with a back face of the transferred face of the transferred object in the state where a transferred face of the transferred object is brought into contact with the transfer face of the transfer head at the transfer. Furthermore, to obtain better transfer property, the auxiliary roller is provided at a position opposed to the transfer face of the transfer head. To suitably support the transferred object from the front and backsides irrespective of the thickness of the transferred object, it is preferred that the backing face of the auxiliary roller is located as opposed to the transfer face, thereby relatively separating the backing face from the transfer face. To configure the feeding mechanism using the above-mentioned auxiliary roller, it is desirable that by rotating the auxiliary roller by the certain angle due to the external force and thus moving the transferred object by the certain dimension in a counter-transfer direction reverse to the transfer direction, the transferring object is drawn from the transfer face of the transfer head, resulting in that the feeding mechanism can feed the transferring object to the transferred object by the certain dimension. Here, the mode in which the feeding mechanism rotates the auxiliary roller may be the mode of directly rotating the auxiliary roller or the mode of indirectly rotating the auxiliary roller. That is, the mode of directly rotating the auxiliary roller by a certain angle with a finger is also included. As a desirable switching mechanism in the case of adopting such feeding mechanism, it is desirable that the switching mechanism switches between the feeding state where the auxiliary roller can be rotated by the certain angle depending the feeding mechanism and the normal use state where the auxiliary roller can rotate without depending on the feeding mechanism.

To transfer the transferring object while the transferred object together with the transfer tool main unit are held by hand without requiring no base such as a table or desk, it is desirable that the transfer tool according to the present invention further comprising a transferred object supporter capable of contacting against the transferred object from the back face corresponding to the area which is in contact with the transfer face of the transferred object in the state where the transfer face is brought into contact with the transferred object, wherein an inserting space into which the transferred object can be inserted is formed between the transferred object supporter and the transfer tool main unit, and the transfer head is disposed in the inserting space so that at least the transfer face is exposed from the transfer tool main unit and the auxiliary roller is disposed so that the backing face is exposed from the transferred object supporter To effectively prevent the operating part from being provided at the transfer tool main unit which has no space for any new member since a lot of parts relating to the transferring object are accommodated therein and also to effectively ensure a space for constituting the feeding mechanism, it is desirable that, by rotating the auxiliary roller by a certain angle due to the external force and thus moving the transferred object by the certain dimension in a counter-transfer direction reverse to the transfer direction, the transferring object is drawn from the transfer face of the transfer head, resulting in that the feeding mechanism can feed the transferring object to the transferred object by the certain dimension, and at least the auxiliary roller and an operating part capable of rotating the auxiliary roller by a certain angle due to an external force are provided and the operating part is formed at the transferred object supporter. Furthermore, as a desirable mode of the switching mechanism in the case of adopting the above-mentioned feeding mechanism, the switching mechanism switches between the feeding state where the auxiliary roller can be rotated by the certain angle by the operating part and the normal use state where the auxiliary roller can rotate without depending on the operating part.

Furthermore, to stably rotate the auxiliary roller with simple configuration, it is desirable that the auxiliary roller has an auxiliary roller main unit capable of contacting against the transferred object and a pinion rotating together with the auxiliary roller main unit, and the operating part rotates the pinion by the certain angle, thereby rotating the auxiliary roller by the certain angle. To configure the operating part so as to suitably rotate the pinion and be easy to handle, it is desirable that the operating part has an operating lever operably attached to the transferred object supporter and a floating engaging member capable of engaging with the pinion following the operation of the operating lever, a rack part engaged with the pinion, which is capable of rotating the backing face of the auxiliary roller in the counter-transfer direction is formed at the floating engaging member, and the floating engaging member is configured so as to be capable of taking an engaging attitude in which the rack part engages with the pinion and a retreating attitude in which the rack part is separated from the pinion. Furthermore, to realize high operating accuracy of the operating lever with such simple configuration, it is desirable that the operating lever is rotatably and pivotally attached to the transferred object supporter at one end thereof and supports the floating engaging member at the other end thereof, and a moving direction of the other end and the floating engaging member around one end of the operating lever substantially corresponds to a tangent line direction of the pinion. Here, as a desirable mode of the switching mechanism in the case of adopting the above-mentioned floating engaging member, the switching mechanism switches between a feeding state where the floating engaging member takes the engaging attitude and a normal use state where the floating engaging member takes the retreating attitude.

Moreover, to effectively prevent a wrong operation of rotating the pinion caused by the rotation of the operating lever in a direction reverse to a predetermined operating direction given that the pinion is operated only when the operating lever rotates in the predetermined operating direction, it is preferred that the operating lever is rotatably and pivotally attached to the transferred object supporter at one end thereof and supports the floating engaging member at the other end thereof, and the switching mechanism is configured such that the floating engaging member takes the engaging attitude when the operating lever is rotated in a predetermined operating direction so that the pinion rotates the backing face of the auxiliary roller in the counter-transfer direction and the floating engaging member takes the retreating attitude when the operating lever is rotated in a direction reverse to the operating direction. As a specific mode, in addition to the above-mentioned configuration, the operating lever is rotatably and pivotally attached to the transferred object supporter at one end thereof and supports the floating engaging member at the other end thereof, a supporting shaft supporting the floating engaging member is provided at the other end of the operating lever, an attitude switching hole supported by the supporting shaft is formed at the floating engaging member, an engaging position is set at one end of the attitude switching hole as a long hole and a retreating position is set at the other end of the attitude switching hole, the switching mechanism is configured such that the floating engaging member takes the engaging attitude by locating the supporting shaft at the engaging position in the attitude switching hole when the operating lever is rotated in a predetermined operating direction so that the pinion rotates the backing face of the auxiliary roller in the counter-transfer direction, and the floating engaging member takes the retreating attitude by locating the supporting shaft at the retreating position in the attitude switching hole when the operating lever is rotated in a direction reverse to the operating direction. With such configuration, the switching mechanism can be configured easily and suitably merely by using the hole provided to support the floating engaging member by the operating lever without adding any part for switching between the engaging attitude and the retreating attitude.

To easily and continuously transfer the transferring object by the feeding mechanism so as to easily operate the operating lever in a repeated fashion, when the operating lever is rotated in a predetermined operating direction so that the pinion rotates the backing face of the auxiliary roller in the counter-transfer direction, an elastic deforming part for accumulating a force rotating the operating lever in a direction reverse to the operating direction due to elastic deformation is formed at the operating lever.

On the other hand, as another mode of configuring the operating part, to allow the floating engaging member to suitably follow the operation of the operating lever, it is desirable that the operating lever is rotatably and pivotally attached to the transferred object supporter at one end thereof and supports the floating engaging member at the other end thereof, an attitude switching hole supporting the floating engaging member is formed at the other end of the operating lever, a supporting shaft is provided at the floating engaging member, an engaging position is set at one end of the attitude switching hole as a long hole and a retreating position is set at the other end of the attitude switching hole, the switching mechanism is configured such that the floating engaging member takes the engaging attitude by locating the supporting shaft at the engaging position in the attitude switching hole when the operating lever is rotated in a predetermined operating direction so that the pinion rotates the backing face of the auxiliary roller in the counter-transfer direction, and the floating engaging member takes the retreating attitude by locating the supporting shaft at the retreating position in the attitude switching hole in the normal use state, when the rack part comes into contact with the pinion and the floating engaging member repulses due to the rotation of the pinion with the rotation of the auxiliary roller caused by moving the transferred object in the counter-transfer direction.

Furthermore, to suitably switch between the engaging position and the retreating position as necessary, it is preferred that an elastic deforming part for accumulating a force of moving the supporting shaft to the engaging position therein is formed at the floating engaging member when the supporting shaft is located at the retreating position in the attitude switching hole.

To maintain the feeding state even when the rack part engages with the pinion in the engaging state and suitably switch the feeding state to the normal use state as necessary, it is desirable that a plurality of transmitting teeth each having a transmitting face facing a direction of rotating the pinion and an inclined face connecting between the transmitting faces are formed at the rack part and a plurality of engaging teeth each having an engaging face capable of engaging the pinion with the transmitting face are formed, the feeding mechanism is configured so that when the transmitting tooth of the rack part operates in the direction in which the transmitting face of the transmitting tooth comes into contact with the engaging face of the engaging tooth in the feeding state where the floating engaging member takes the engaging attitude, the pinion rotates in conjunction with the rack part with the floating engaging member being taking the engaging attitude, and the switching mechanism is configured so that when the engaging tooth of the pinion moves and the front end of the engaging tooth comes into contact with the inclined face of the transmitting tooth in the feeding state, the rack part is separated from the pinion and the floating engaging member switches from the engaging attitude to the retreating attitude, thereby switching to the normal use state where the pinion runs idle relative to the rack part.

To effectively prevent the occurrence of strike sound caused by striking against the rack part when the pinion is rotated in the normal use state, it is desirable to provide the releasing mechanism for separating the rack part from the pinion so as not to contact against each other in the normal use state. Here, the releasing mechanism does not limit which of the rack part and the pinion should be moved and for example, may move both of them.

To suitably set the releasing mechanism without changing the setting of the auxiliary roller and the pinion, it is desirable that the releasing mechanism is configured so as to switch the floating engaging member from the engaging attitude in which the pinion engages with the rack part to the releasing attitude in which the pinion is separated from the rack part with the operation of the operating lever. The releasing mechanism may change to the releasing attitude at any of operating range of the operating lever. Here, the releasing mechanism may move the floating engaging member to the releasing attitude in the vicinity of the lead edge in the operating range of the operating lever or to the releasing attitude in the vicinity of the rotating end edge. However, especially to easily operate the releasing mechanism without requiring any special operation, it is preferred to configure that the releasing mechanism is configured so as to bring the floating engaging member into the releasing attitude in the vicinity of a rotating end edge in a rotating range of the operating lever. Furthermore, to allow the floating engaging member to take the releasing attitude by operating the operating lever at a desired timing, it is preferred to attach an elastic member for accumulating an elastic repulsive force in the reverse direction when the operating lever is rotated to the operating lever.

To suitably set the moving range in which the floating engaging member can move and the timing at which the floating engaging member is moved, respectively, it is desirable that the releasing mechanism has a floating engaging member supporting mechanism capable of movably supporting the floating engaging member so as to take the engaging attitude or the releasing attitude and an operating force converting mechanism for converting the rotating operation of the operating lever into a retreating operation from the engaging attitude to the releasing attitude.

Moreover, to accurately move the floating engaging member with simple configuration, it is desirable that the floating engaging member supporting mechanism has a supporting shaft which is formed at one of the operating lever and the floating engaging member and supports the floating engaging member and an attitude switching part which is formed at the other of the operating lever and the floating engaging member and movably supports the supporting shaft so that the floating engaging member may take the engaging attitude and the releasing attitude. Furthermore, to stably move the floating engaging member between the engaging attitude and the releasing attitude, it is desirable that the floating engaging member supporting mechanism has an elastic deforming part for accumulating a repulsive force returning the floating engaging member to the engaging attitude when the floating engaging member takes the releasing attitude.

To stably convert the operating force exerted on the operating lever into the attitude switching operation of the floating engaging member, it is desirable that the operating force converting mechanism has a cam face provided at one of the transferred object supporter and the floating engaging member, and an urging part which is provided at the other of the transferred object supporter and the floating engaging member and can slidingly contact against the cam face. As a specific configuration which realizes the operating force converting mechanism with simple structure, the cam face is formed on the upper face of the floating engaging member and the urging part is provided at a position opposed to the cam face on the lower face of the transferred object supporter. To stably locate the floating engaging member in the releasing attitude during use in the normal use state, it is preferred that a positioning part for coming into contact with the urging part to position the floating engaging member in the releasing attitude when the operating lever is located at the rotating end edge is formed at the cam face.

In addition, the transfer tool according to the present invention is characterized by that a transfer tool used when a transferring object is transferred on a transferred object such as a paper comprising at least a transfer tool main unit having a transfer head capable of bringing the transferring object into contact with the transferred object and a transferred object supporter capable of contacting against the transferred object from a back face corresponding to a contact area with the transfer head of transferred object in the state where the transfer head contacts against the transferred object, wherein the transfer head is configured so as to have a transfer face which comes into contact with the transferred object and on which the transferring object is transferred at the transfer of the transferring object on the transferred object and transfer the transferring object on the transferred object by bringing the transfer face into contact with the transferred object and moving the transfer face in a predetermined transfer direction, an inserting space into which the transferred object is inserted is formed between the transferred object supporter and the transfer tool main unit and the transfer head is disposed in the inserting space so that at least the transfer face is exposed from the transfer tool main unit, and a feeding mechanism for feeding the transferring object to the transferred object by a certain dimension through the transfer face in the state where the transfer face is stopped and pressed with respect to the transferred object.

In such transfer tool, given that the transferred object is sandwiched between the transfer head and the transferred object supporter in the inserting space, the transferring object can be continuously transferred on the transferred object by a certain dimension using the feeding mechanism with the transferred object and the transfer tool main unit being held by hand.

EFFECTS OF THE INVENTION

As described above, according to the present invention, since there are provided the feeding mechanism for feeding the transferring object to the transferred object by the certain dimension through the transfer face in the state where the transfer face is stopped and pressed with respect to the transferred object and the switching mechanism for selectively switching the feeding state by the action of the feeding mechanism and the normal use state where the feeding state is released in the state where the transfer face is in contact with the transferred object, it is possible to continuously switch between the mode of transferring the transferring object by the certain dimension and the mode of transferring the transferring object of any dimension. That is, even in the feeding state where the transferring object can be transferred by the certain dimension using the feeding mechanism, since the switching mechanism selectively switches from the feeding state to normal use state in the state where the transfer face is pressed to the transferred object, as in the conventional transfer tool, it is possible to arbitrarily switch to the mode of transferring the transferring object of any dimension without leaving the transfer face from the transferred object. Furthermore, in the conventional transfer tool, for example, when a thin paper is used as the transferred object, the transferred object can be broken by the force of pressing the vicinity of the end part of the transferred object with a hand and the force of moving the transfer face in a predetermined transfer direction. However, by using the feeding mechanism according to the present invention, the transferring object can be transferred on the transferred object by the certain dimension and even when a thin paper is used as the transferred object, the transferring object can be stably transferred without breaking the paper.

Moreover, according to the present invention, given that the transferred object is sandwiched between the transfer head and the transferred object supporter in the inserting space, the transferring object can be continuously transferred on the transferred object by a certain dimension using the feeding mechanism with the transferred object and the transfer tool main unit being held by hand, and even when a thin paper is used as the transferred object, the transferring object can be stably transferred without breaking the paper.

BEST MODE FOR CARRYING OUT THE INVENTION

Hereinafter, an embodiment of the present invention will be described with reference to figures.

Figure 1:
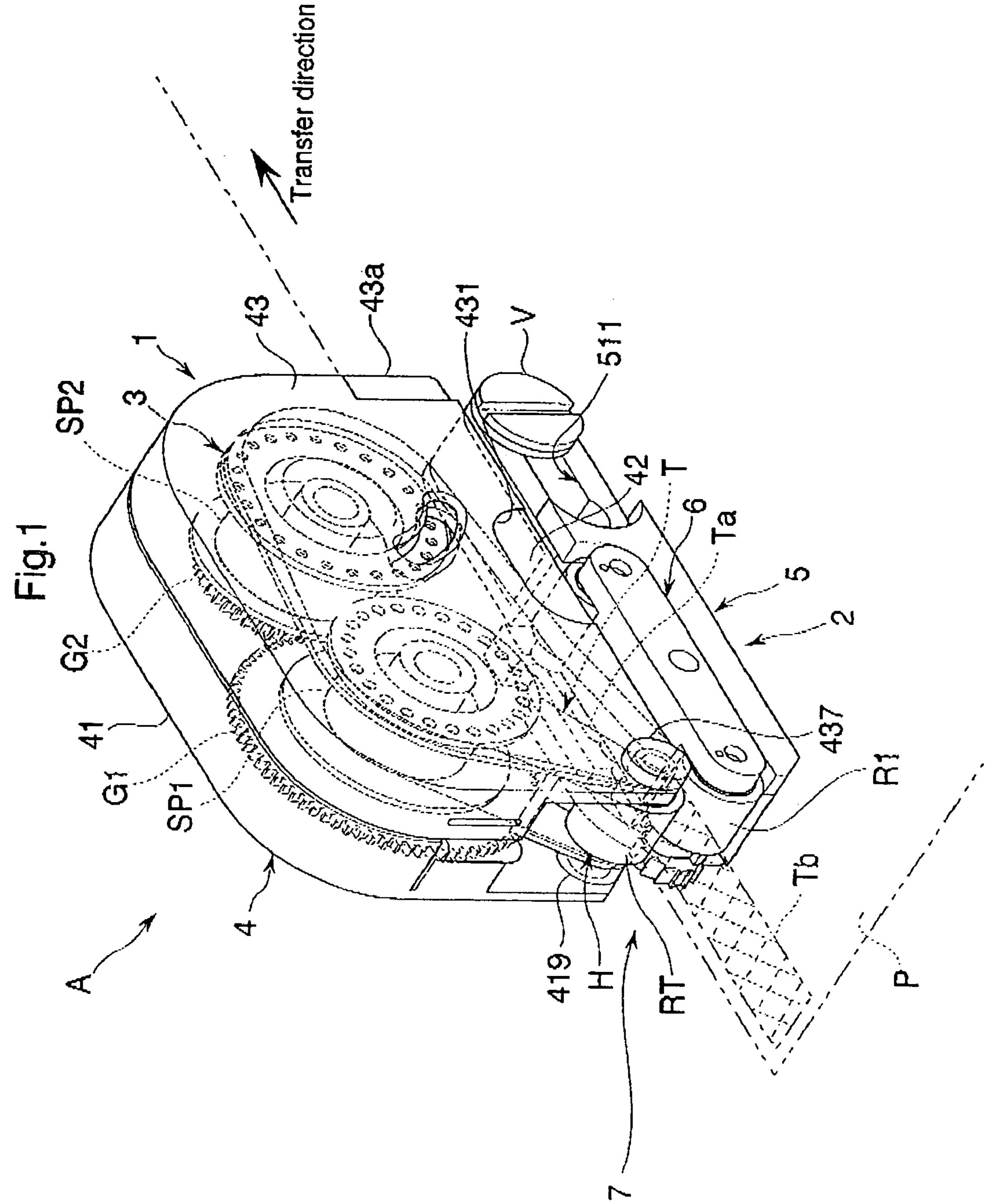
FIG. 1 is a perspective view of a transfer tool in accordance with a first embodiment of the present invention.
Figure 2:
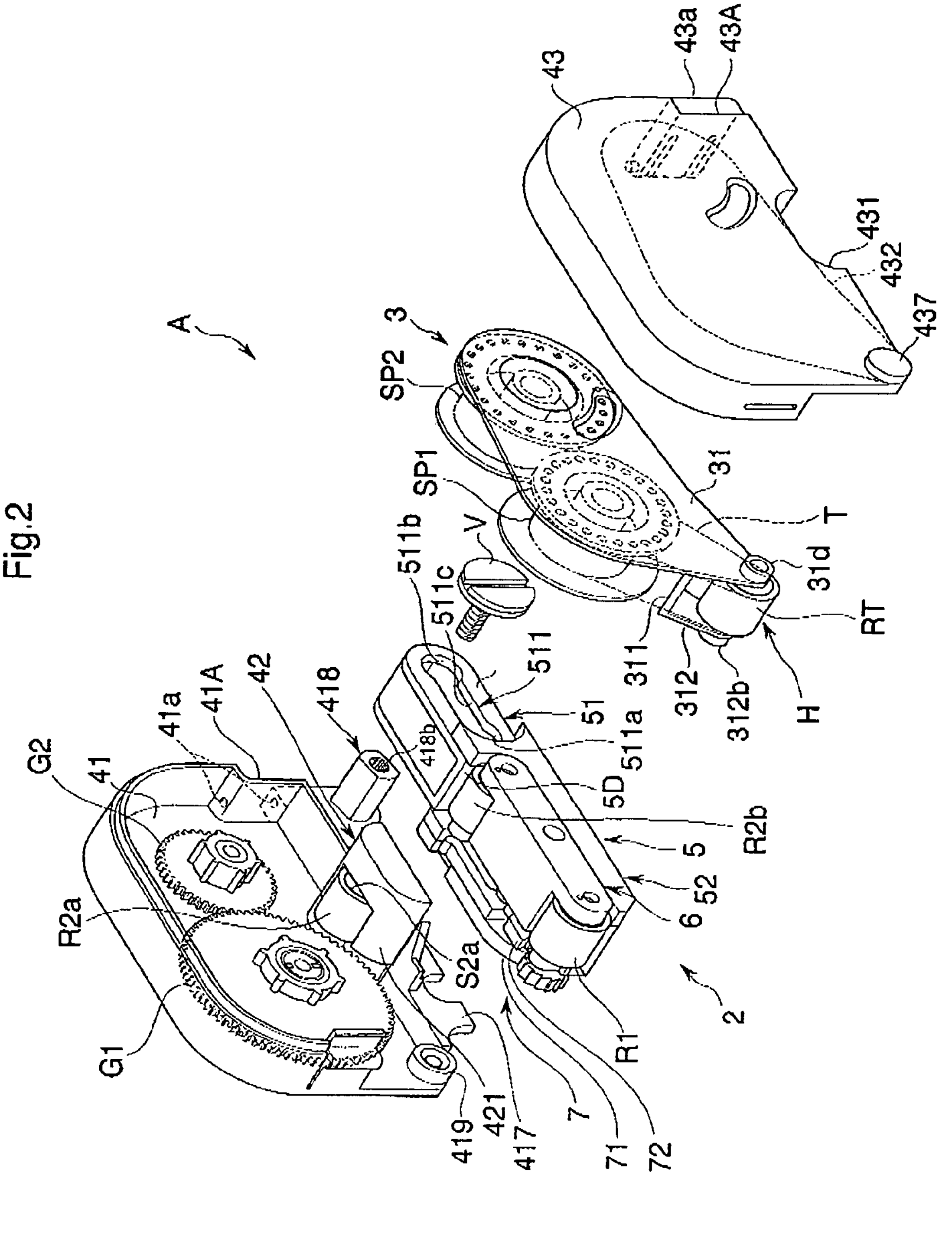
FIG. 2 is an exploded perspective view in accordance with the first embodiment.
Figure 3:
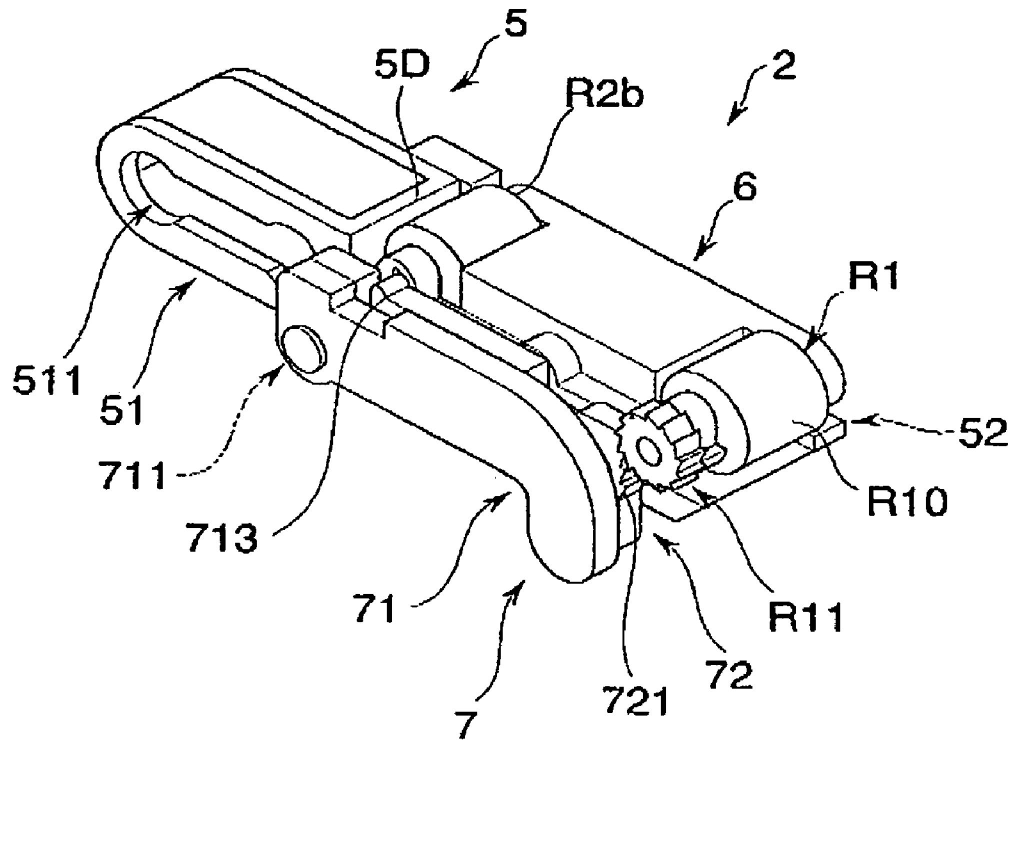
FIG. 3 is a perspective view of a main part in accordance with the first embodiment.

A transfer tool A in accordance with this embodiment, as shown in FIG. 1 and FIG. 2, for example, serves to adhere a tape glue T consisting of a tape main body Ta and a glue Tb as a transferring object adhered to one side of the tape main body Ta to a paper P as a transferred object.

The transfer tool A mainly includes a transfer tool main unit 1 having a transfer head H, which holds the tape glue T and allows the tape glue T to comes into contact with the paper P, and a transferred object supporter 2 attached to the transfer tool main unit 1.

In the transfer tool A, the transferred object supporter 2 is provided with an operation unit 7 having an operation lever 71 described later. The operation unit 7 together with an auxiliary roller R1 described later functions as a feeding mechanism X for feeding the glue Tb to the paper P as the transferred object through a transfer face RTa described later by a predetermined dimension in the state where the tape glue T is pressed onto the paper P through a transfer face RTa and stopped there and also functions as a switching mechanism Z for selectively switching between a feeding state x in which the feeding mechanism X is operating and a normal use state y in which the feeding state x is released through the transfer face RTa with the tape glue T being in contact with the paper P.

In the following description, “front” as a term expressing position or direction refers to a side on which the transfer head H of the transfer tool A is located and “rear” refers to a side on which the transfer head H is located in the longitudinal direction of the transfer tool A. In other words, the “rear” is a direction in which the transfer tool A moves relative to the paper P when the glue T is transferred on the paper P, that is, a “transfer direction” according to the present invention. A “forward-rearward direction” refers to the longitudinal direction of the transfer tool A. “Upper” refers to a side on which the transfer tool main unit 1 is located in the transfer tool A and “lower” refers to a side on which the transferred object supporter 2 is located in the transfer tool A.

The transfer tool main unit 1 has a refill cartridge 3 for holding the tape glue T therein and a case 4 for detachably storing the refill cartridge 3 therein.

The refill cartridge 3, as shown in FIG. 2, mainly comprises an inner side plate 31 rotatably supporting an unwinding spool SP1 and a winding spool SP2, respectively, and the transfer head H is rotatably supported by a front end of the inner side plate 31.

The transfer head H has a transfer roller RT capable of rotating at the transfer of the tape glue T on the paper P. The transfer roller RT is formed of a cushioning material which can be elastically deformed by an external force. By providing an orthogonal piece 311 extending by a predetermined size in a direction orthogonal to the inner side plate 31 and a parallel piece 312 extending substantially parallel to the inner side plate 31 from a front end of the orthogonal piece 311 in an integral fashion in the vicinity of a front end of the inner side plate 31 and inserting side ends of a rotational spindle ST of the transfer roller RT into through holes formed on a front end of the parallel piece 312 and a predetermined region of the inner side plate 31 opposed to the front end of the parallel piece 312, respectively, the transfer RT is configured so as to rotate around the rotational spindle ST. Here, in this embodiment, the front end of the transfer head H refers to a front end of the transfer face RTa as a region of the transfer roller RT, which comes into contact with the paper P and transfers the tape glue T at the transfer. The transfer face RTa can rotate at the transfer. Furthermore, cylindrical parts 312*b* and 31*d* which protrude outwards are formed at the front end of the parallel piece 312 and a predetermined region of the inner side plate 31 opposed to the front end of the parallel piece 312 and these cylindrical parts 312*b* and 31*d* can be fitted into fitting parts 419 and 437 formed on outer side plates 41 and 43 described later, respectively.

On the other hand, the case 4, as shown in FIG. 2, mainly includes the first outer side plate 41 as one outer wall of the transfer tool main unit 1 and the second outer side plate 43, opposed to the first outer side plate 41, as the other outer wall of the transfer tool main unit 1.

Like the inner side plate 31, the first outer side plate 41 is shaped like a thin plate made of synthetic resin, for example, and in this embodiment, is shaped like a rectangle with round corners when viewed from the side. On an inner face of the first outer side plate 41 are attached an unwinding gear G1 for rotationally driving the unwinding spool SP1 and the winding spool SP2 and a winding gear G2 which has a smaller diameter than the unwinding gear G1 and engages with the unwinding gear G1. A part of a lower periphery of the first outer side plate 41 is discontinuously formed and a second auxiliary roller R2*a* is rotatably attached thereto through a fixing member 42 formed substantially in the shape of a C in a plan view. Like the transfer roller RT, the second auxiliary roller R2*a* is formed of a cushioning material. In addition, the first outer side plate 41 is integrally provided with an extending piece 417 which extends downward from the lower periphery of the first outer side plate 41. Furthermore, at a rear end of the extending piece 417 is provided a shaft 418 protruding in a direction perpendicular to the extending direction of the extending piece 417. Furthermore, a recessed part 41A formed by recessing a part of a rear edge of the first outer side plate 41 toward a front end is formed and an engaging hole 41*a* engaging with an engaging piece 43*a* provided on a second outer side plate 43 described later is formed on the recessed part 41A.

On the other hand, the second outer side plate 43, like the first outer side plate 41, is shaped like a thin plate made of synthetic resin, for example, and the shape thereof in a side view is set so as to substantially correspond to the shape of the first outer side plate 41 in a side view, and a notch 431 having the substantially same shape as the shape of the fixing member 42 in a side view is formed at the almost center of a lower end of the second outer side plate to avoid an interference with the fixing member 42 formed on the first outer side plate 41. In a predetermined region where an outer side face of the inner side plate 31 of the refill cartridge 31 can come into contact with or in proximity to an inner side face of the second outer side plate 43 is formed an engaging recessed part 432 formed by recessing toward the outer side face side so as to substantially correspond to the shape of the inner side plate 31 in a side view and is thinner than the other region. Furthermore, at a position corresponding to the engaging part 419 provided on the first outer side plate 41, that is, a lower edge in the front end of the second outer side plate 43 is formed the engaging part 437 swelling outward. The engaging part 437 is shaped to engage with both of an inner circumference and an outer circumference of the cylindrical part 31*d* provided at the inner side plate 31 of the refill cartridge 3. In addition, to correspond to the recessed part 41A formed on the first outer side plate 41, a recessed part 43A formed by recessing toward the front end side is formed at a part of a rear edge of the second outer side plate 43 and the engaging piece 43*a* engaging with the above-mentioned engaging hole 41*a* is provided at the recessed part 43A.

To assemble the first outer side plate 41 and the second outer side plate 43 having such configuration in an integral fashion, the engaging hole 41*a* of the first outer side plate 41 is engaged with the engaging piece 43*a* of the second outer side plate 43.

On the other hand, the transferred object supporter 2 mainly includes a base 5 having a bearing part 511 formed so as to support the shaft 418 provided at the extending piece 417 of the first outer side plate 41 and an arm part 6 set to perform balancing action relative to the base 5.

As shown in FIG. 2, the base 5 has a longitudinal width dimension slightly smaller than that of the transfer tool main unit 1 and a stepped part 5D is formed at an almost center part in the forward-rearward direction so that a height dimension in a region extending from an almost center part to a front end of the base 5 in the forward-rearward direction may be smaller than a height dimension in a region extending from the almost center part to a rear end of the base 5 in the forward-rearward direction. In the following description, across the stepped part 5D, a part on the rear end side is referred to as a rear half part 51 and a part on the front end side is referred to a front half part 52. The bearing part 511 is formed in the rear half part 51. The bearing part 511 includes a first large diameter part 511*a* and a second large diameter part 511*b* each having a diameter slightly larger than the diameter of the shaft 418, which are separated from each other with a predetermined distance in the forward-rearward direction, and also a groove 511*c* extending in the forward-rearward direction so as to connect these large diameter parts 511*a* and 511*b* to each other. The shaft 418 can insert into the groove 511*c*.

The arm part 6, as shown in FIG. 2, is disposed in the front half part 52 of the base 5 and at an almost center part thereof in the forward-rearward direction is formed a fitting hole into which a protruding part formed in the front half part 52 of the base 5 is fitted. Alternatively, an extending face part not shown extending toward the opened side of an inserting space AS may be formed on an upper face of the arm part 6, so that at the transfer, the extending face part supports the paper P and the paper P can be easily inserted into the insertion space AS. Furthermore, a transfer start position display means representing a transfer start position of the glue Tb to the paper P may be provided on an upper face of the extending face part. As the transfer start position display means, a transfer start position display line formed substantially along an extension line of the rotational spindle ST of the transfer roller RT and a mounting procedure display provided at the immediately rear of the transfer start position display line are formed on the upper face of the extending face part. Preferably, the transfer start position display line and the mounting procedure display are formed by shallowly engraving on the upper face of the extending face part, a straight line and the shape of the paper P may be adopted as the transfer start display line and the mounting procedure display, respectively. Note that prints or seals on the upper face of the extending face part may be also adopted as the transfer start display line and the mounting procedure display. In this manner, a stable transfer operation and an errorless usage are suggested to the user.

The auxiliary roller R1 capable of rotating in conjunction with the transfer roller RT at the transfer is provided at the front end of the arm part 6 and a second auxiliary roller R2*b* capable of rotating in conjunction with the second auxiliary roller R2*a* in the transfer tool main unit 1 is provided at the rear end of the arm part 6. Specifically, the arm part 6 can performing balancing action relative to the base 5 using the fitting region between the protruding part and the fitting hole as a supporting point. In the case where the arm part 6 is located in substantially parallel to the base 5, an upper edge of the arm part 6 can be set so as to substantially correspond to an upper edge of the rear half part 51 of the base 5.

Figure 4:
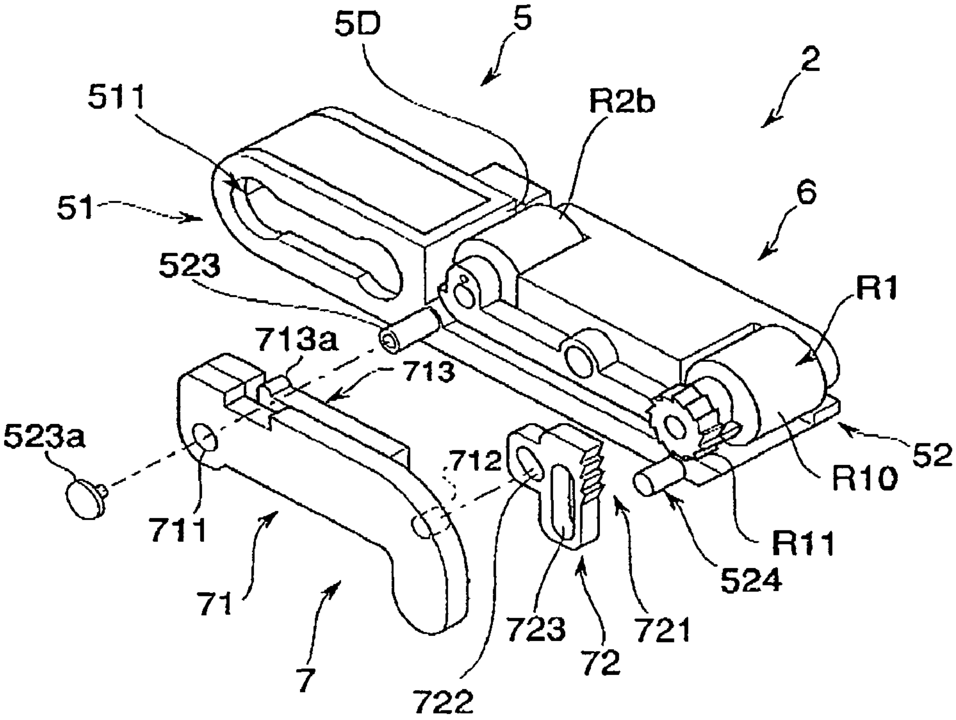
FIG. 4A to 4D are exploded perspective views of a main part in accordance with the first embodiment.
Figure 4:
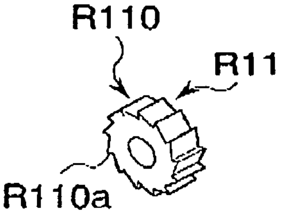
Figure 4:
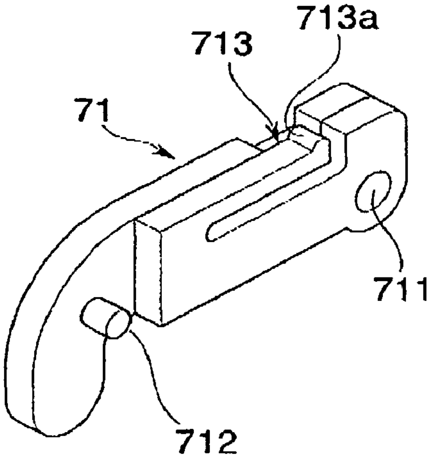
Figure 4:
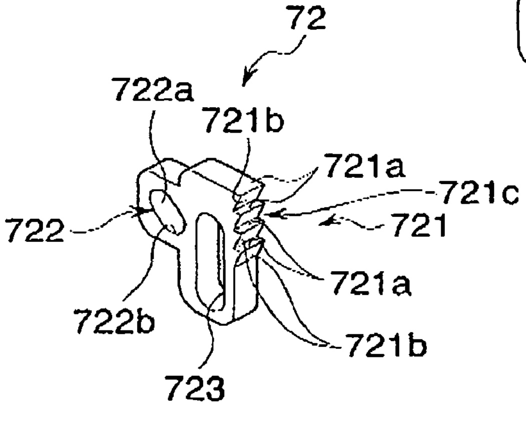

Here, as shown in FIG. 4, an operating part 7 for rotating the auxiliary roller R1 by a certain angle due to a predetermined operating force is attached to the front half part 52 of the base 5 by forming a pivot shaft 523 and a sliding shaft 524. As the feeding mechanism X according to the present invention, the operating part 7 together with the auxiliary roller R1 functions to move the auxiliary roller R1 by a certain dimension in the counter-transfer direction at a use position (O) described later and in conjunction with it, move also the transfer roller RT by the certain dimension in the counter-transfer direction to pull out the tape glue T from the transfer face RTa of the transfer roller RT, thereby sending out the glue Tb to the paper P by the certain dimension. The operating part 7 together with the auxiliary roller R1 also functions as the switching mechanism Z which selectively switch between the feeding state x feeding the tape glue T to the paper P by a certain dimension depending on the feeding mechanism X and the normal use state y releasing the feeding state x and feeding the tape glue T to the paper P without depending on the feeding mechanism X, in other words, rotating the transfer roller RT in the counter-transfer direction without depending on the operating part 7, according to the use state of the transfer tool A and the operating mode of the operating part 7.

In addition to the above-mentioned configuration as shown in FIG. 4 as an exploded view in the vicinity of the operating part 7, the auxiliary roller R1 comprises an auxiliary roller main unit R10 which can come into contact with the paper P and a pinion R11 which is coaxially disposed and rotates with the auxiliary roller main unit R10. In comparison with a normal gear, the pinion R11 is formed so that each engaging tooth R110 is inclined in one direction and a face of each engaging tooth R110 which is oriented to the direction of rotating the pinion R11 as an engaging face R110*a* is engaged with a floating engaging member 72 described later (FIG. 4B).

The operating part 7 comprises an operating lever 71 and the floating engaging member 72. A pivot shaft 711 is formed at the side of a proximal end as one end of the operating lever 71 and pivoted by a pivot shaft 523 and a pin 523*a* which are formed at the base 5 described above, and a supporting shaft 712 (FIG. 4C) is formed at the side of a front end as the other end and supports the floating engaging member 72. When the operating lever 71 is rotated, the track of the supporting shaft 712 and the floating engaging member 72 substantially accords with the tangential direction of the pinion R11 and is set so that the floating engaging member 72 supported on the front end may move on the tangent line of the pinion R11. In the vicinity of the proximal end of the operating lever 71 is formed an elastic deforming part 713 which accumulates a force of rotating the operating lever 71 downward by bringing the operating lever 71 into contact with the above-mentioned extending piece 417 to be elastically deformed when the operating lever 71 is rotated upward (FIG. 4C). The floating engaging member 72 is provided with a rack part 721 capable of engaging the pinion R11 at the upper front portion, an attitude switching hole 722 as an elliptical hole which is supported by the supporting shaft 712 formed at the operating lever 71 and extends in the inclining direction at the upper rear portion and a sliding hole 723 which extends in the vertical direction and is slidably supported by the sliding shaft 524 formed at the base 5 in the vertical direction in the lower front portion. The rack part 721 has a plurality of transmitting teeth 721*c* (four in this embodiment) each consisting of an upward transmitting face 721*a* which can come into contact with the engaging face R110*a* of the pinion R11 described above and an obliquely downward inclined face 721*b* (FIG. 4D). Furthermore, in the attitude switching hole 722, defining a part located in the relatively upper portion as an engaging position 722*a* and a part located obliquely upward of the engaging position 722*a* as a retreating position 722*b*, the pinion R11, the operating lever 71 and the floating engaging member 72 each are set and assembled so that the rack part 721 may engage with the pinion R11 when the supporting shaft 712 of the operating lever 71 is located at the engaging position 722*a*.

To assemble the transfer tool main unit 1 and the transferred object supporter 2 having such configuration, first, the shaft 418 provided at the first outer side plate 41 of the transfer tool main unit 1 is inserted into the bearing part 511 formed at the base 5 of the transferred object supporter 2. Specifically, the shaft 418 is inserted into the second large diameter part 511*b* formed on the rear edge side of the bearing part 511 and a screw V is screwed into a screw hole formed on the shaft 418 in this state to undetachably assemble the transferred object supporter 2 to the transfer tool main unit 1 in an integral fashion. In this embodiment, for the facilitation of a screwing operation, so-called thumb screw is used as the screw V. In this assembled state, using a pivot point between the shaft 418 and the second large diameter part 511*b* as a fulcrum, the transferred object supporter 2 is rotatably set relative to the transfer tool main unit 1 at between a non-use position (P) where the transferred object supporter 2 is separated from the transfer head H of the transfer tool main unit 1 by a predetermined distance and a use position (O) where the transferred object supporter 2 comes into contact with or in proximity to the transfer head H of the transfer tool main unit 1. In this embodiment, when the transferred object supporter 2 is located at the non-use position (P), the transferred object supporter 2 forms a predetermined angle (about 15 degrees in this embodiment) relative to the transfer tool main unit 1 (refer to FIG. 5B).

Then, when the transferred object supporter 2 is located at the use position (O), the extending piece 417 formed at the first outer side plate 41 of the transfer tool main unit 1 comes into contact with a part of the arm part 6 of the transferred object supporter 2 (refer to FIG. 5A), thereby preventing the transfer tool main unit 1 from getting close to the transferred object supporter 2 by a predetermined distance or smaller. At the use position (O), the transfer roller RT provided at the transfer tool main unit 1 and the auxiliary roller R1 provided at the transferred object supporter 2 are opposed to each other in the state where they come into contact or in proximity to each other, and at a position away from the opposed position of the transfer roller RT and the auxiliary roller R1 in the transfer direction by a predetermined distance, the second auxiliary roller R2*a* provided at the transfer tool main unit 1 and the second auxiliary roller R2*b* provided at the transferred object supporter 2 are opposed to each other in the state where they come into contact or in proximity to each other to form the inserting space AS where the paper P can be inserted between the transfer tool main unit 1 and the transferred object supporter 2. In this case, in the inserting space AS, the transfer face RTa of the transfer roller RT and a backing face R1*a* of the auxiliary face R1 are opposed to each other in the state where they come into contact or in proximity to each other, and a lower edge of the second auxiliary roller R2*a* provided at the transfer tool main unit 1 and an upper edge of the second auxiliary roller R2*b* provided at the transferred object supporter 2 are opposed to each other in the state where they come into contact or in proximity to each other.

Next, usage and operations of the transfer tool A having such configuration will be described with reference to FIG. 6 as a sectional view taken along B-B in FIG. 5 and FIG. 5A.

Figure 5:
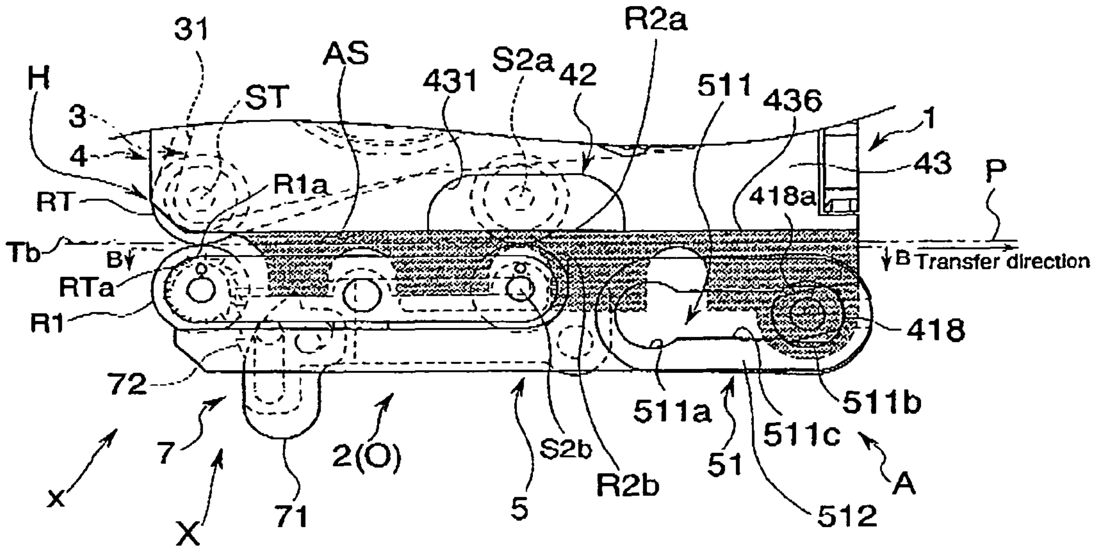
FIGS. 5A and 5B are side views in accordance with the first embodiment.
Figure 5:
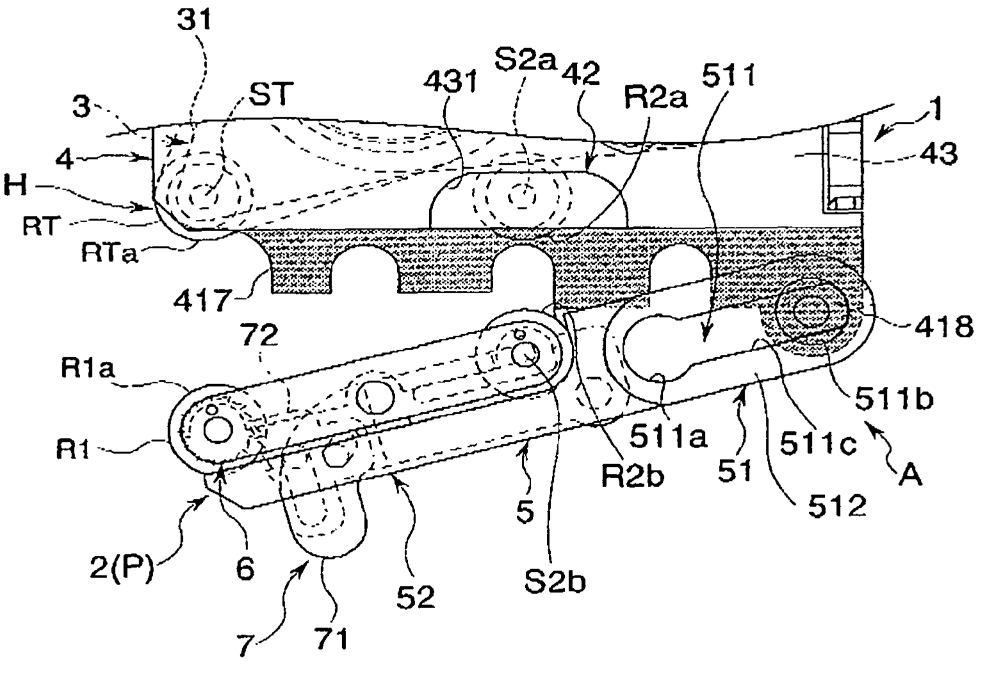
Figure 6:
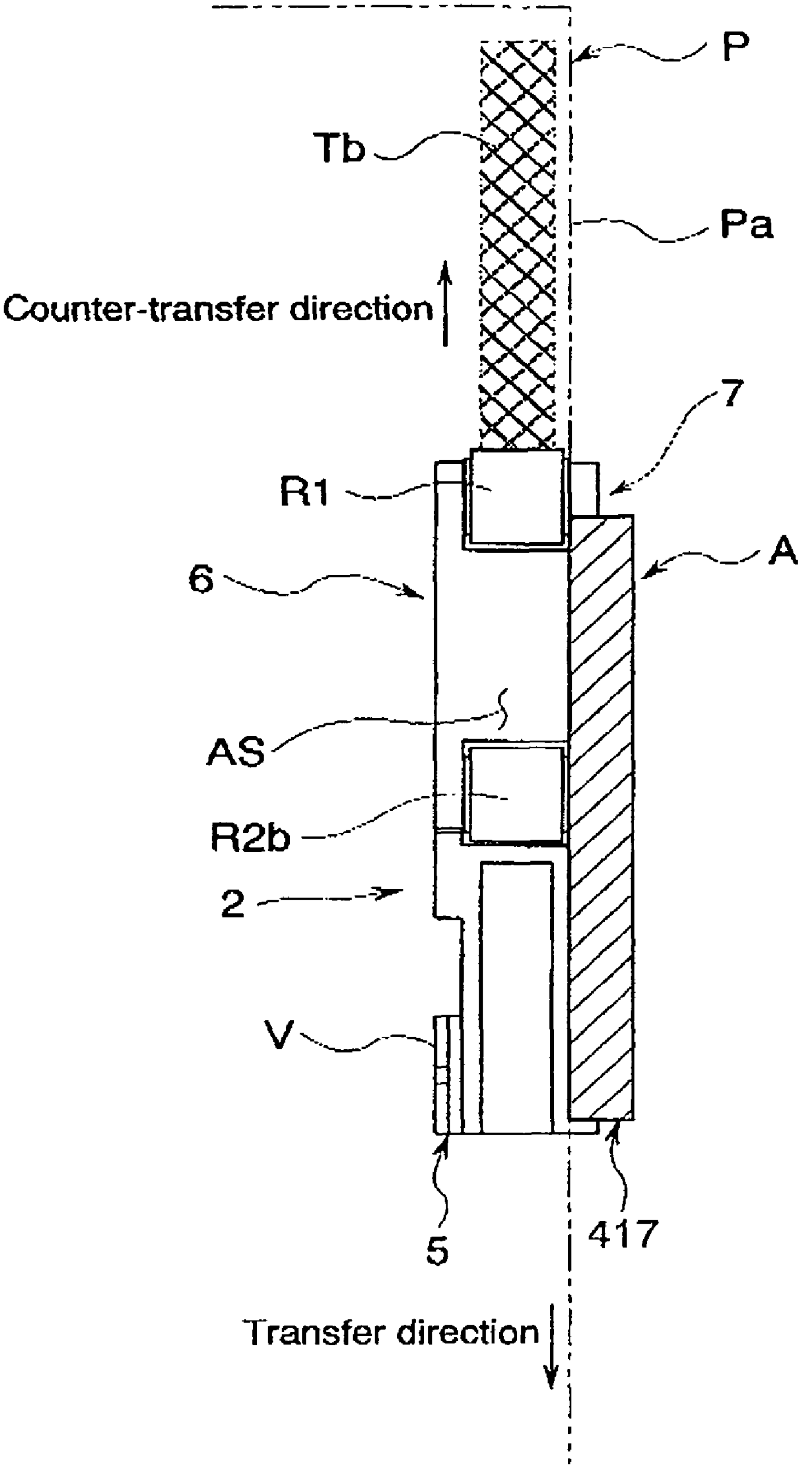
FIG. 6 is a sectional view taken along B-B in FIG. 5A.

First, in the state shown in FIG. 5, the overall transfer tool A is grasped by placing a right thumb, for example, on the upper face of the transfer tool main unit 1 and placing the other fingers on the transferred object supporter 2. At this time, the transfer tool A is held so that the extending piece 417 of the transfer tool main unit 1 is located on the palm side. Then, in the state where the transferred object supporter 2 is located at the non-use position (P), the paper P is brought closer to the transfer tool A so that the an edge Pa of the paper P (FIG. 6) may come into contact with or in proximity to the extending piece 417 of the transfer tool main unit 1. Subsequently, when the transfer tool A is strongly grasped and grasping power is applied in the direction of brining the transferred object supporter 2 closer to the transfer head H, the transferred object supporter 2 rotationally moves relative to the transfer tool main unit 1 to the use position (O). At this time, the extending piece 417 comes into contact with a part of the arm part 6 as described above, the transfer roller RT and the auxiliary roller R1 are opposed to each other with the paper P being sandwiched therebetween and the second auxiliary rollers R2*a* and R2*b* are opposed to each other with the paper P being sandwiched therebetween.

Then, at the use position (O) shown in FIG. 5A, the feeding state x in which the auxiliary roller R1 can work with the transfer roller RT and the above-mentioned operating part 7 can rotate the transfer roller RT through the auxiliary roller R1 is constituted. From the state where the transfer roller RT is pressed onto the paper P in this manner, as shown in FIG. 6, the feeding mechanism x feeds the paper P in the counter-transfer direction by a certain dimension to transfer the glue Tb on the paper P by rotating the operating lever 7 in the operating direction, that is, upward, with an index finger, for example.

A mode of a series of operations of the operating part 7 in the use state (O) will be schematically described in detail with reference to FIG. 7A, FIG. 7B, FIG. 8A and FIG. 8B.

Figure 7:
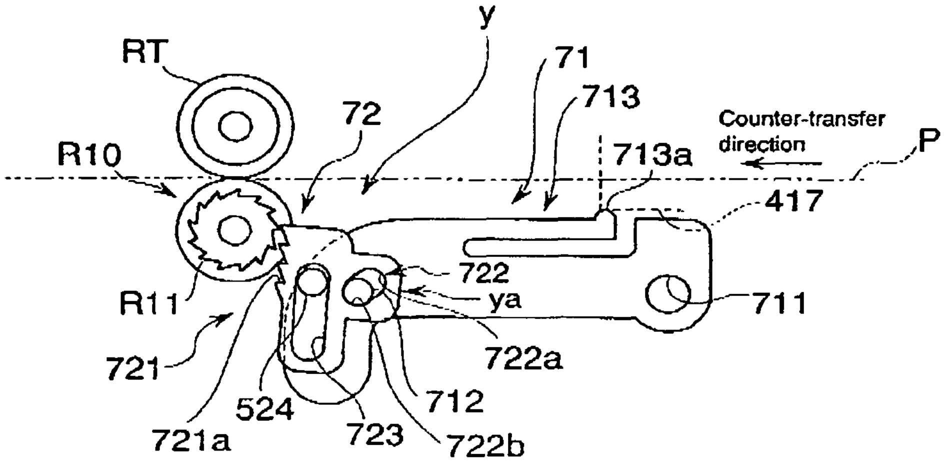
FIGS. 7A and 7B are operation explanation views in accordance with the first embodiment.
Figure 7:
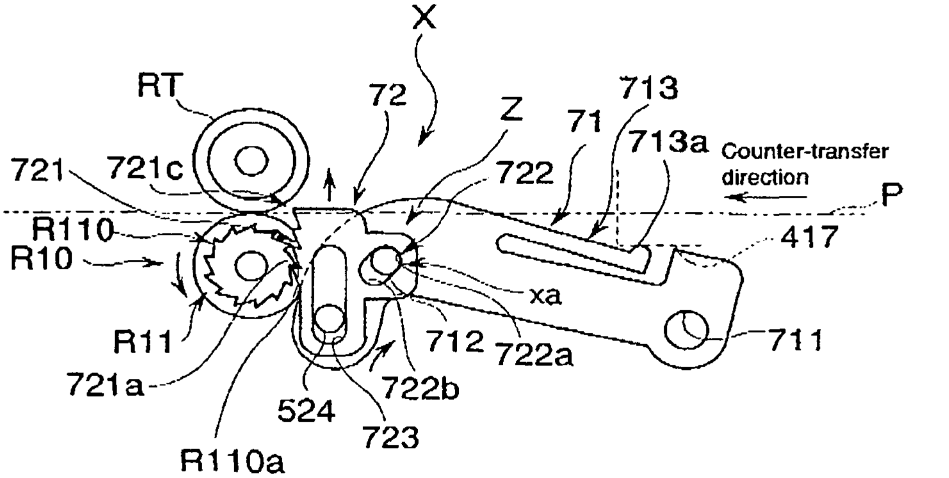

First, FIG. 7A shows the state where the operating lever 71 applies an operating force at the use position (O). In this state, a front end 713*a* of the elastic deforming part 713 of the operating lever 71 is in contact with a predetermined position of the extending piece 417 on the side of the transfer tool main unit 1. At this time, the floating engaging member 72 is in the normal use state y where the transmitting face 721*a* of the rack part 721 is slightly away from the engaging face R110*a* of the pinion R11. In this state, the floating engaging member 72 is supported mainly by an upper end of the sliding shaft 524 of the base 5 and the supporting shaft 712 of the operating lever 71 is located at the retreating position 722*b* in the attitude switching hole 722 in a retreating attitude ya.

Then, when the operating lever 7 is rotated upward, as shown in FIG. 7B, the front end of the operating lever 7 moves upward while the elastic deforming part 713 is elastically deformed, whereby the supporting shaft 712 mainly supports the floating engaging member 72. At this time, the supporting shaft 712 is located at the engaging position 722*a* in the attitude switching hole 722. That is, at this time, the operating part 7 functions as the switching mechanism Z of the present invention of switching from the normal use state y to the feeding state x. floating engaging member 72 is supported by the supporting shaft 712 at the engaging position 722*a*, thereby inclining in the direction in which the upper part of the floating engaging member 72 touches the pinion R11 and the rack part 721 rises in an engaging attitude xa where the transmitting tooth 721*c* of the rack part 721 engages with the engaging tooth R110 of the pinion R11. Subsequently, by the contact between the transmitting face 721*a* of the rack part 721 and the engaging face 110*a* of the pinion R11, the pinion R11 rotates in conjunction with the rise of the rack part 721, and then, when the operating lever 71 reaches a terminal, that is, a rising end, the transmitting tooth 721*c* located at the lowermost in the rack part 721 finishes engaging with the engaging tooth R110. In other words, an angle at which the pinion R11 is rotated by one operation of the operating part 7 is set to be an angle at which four engaging teeth R110 of the pinion R11 are rotated depending on the number of the transmitting teeth 721*c*. At this time, the operating lever 71 accumulates the force of rotating the front end of the operating lever 71 downward by the elastic deforming part 713.

Figure 8:
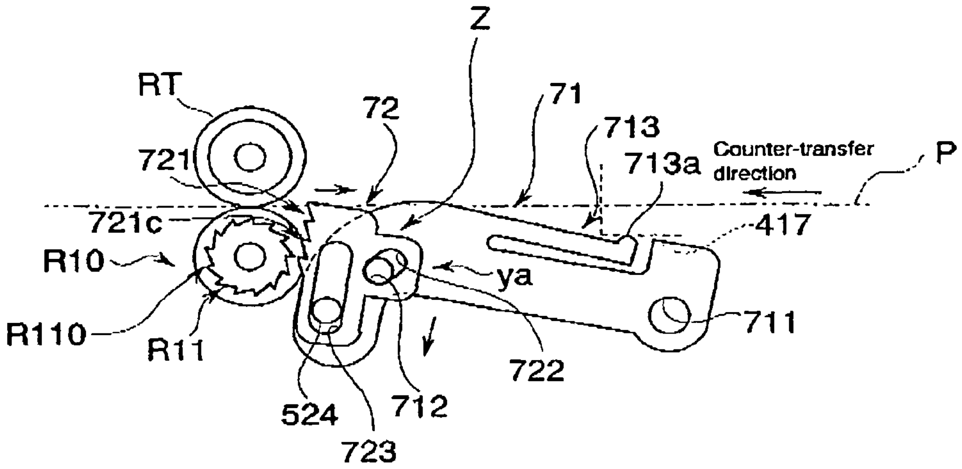
FIGS. 8A and 8B are operation explanation views in accordance with the first embodiment.
Figure 8:
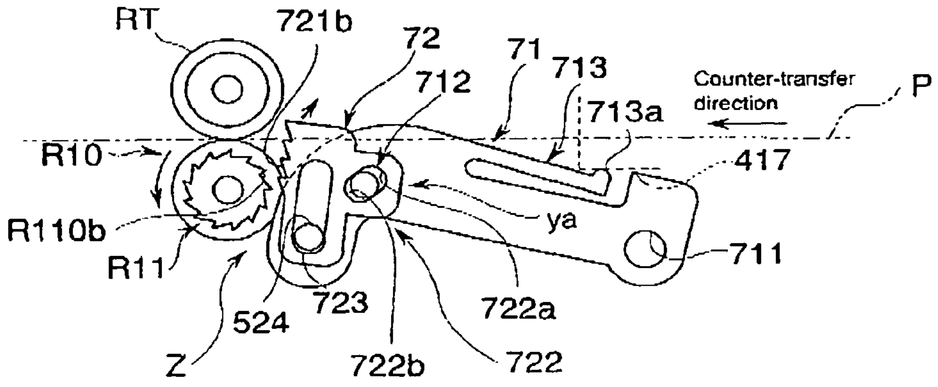

Next, when the operating force of operating the operating lever 71 is released in the state where the operating lever 71 is rotated upward, the front end of the operating lever 71 rotates downward due to the elastic force accumulated in the elastic deforming part 713 as shown in FIG. 8A. At this time, following the front end of the operating lever 71, the floating engaging member 72 also moves downward, and the supporting shaft 712 of the operating lever 71 is located at the retreating position 722*b* in the attitude switching hole 722 at this time, so that the floating engaging member 72 moves downward while maintaining the retreating attitude ya in which the upper part of the floating engaging member 72 is inclined in the direction of separating from the pinion R11. At this time, the normal use state y where the transmitting tooth 721*c* of the rack part 721 does not engage with the engaging tooth R110 of the pinion R11 is constituted.

On the other hand, FIG. 8B shows the state where the transfer roller RT and the auxiliary roller R1 are moved in the counter-transfer direction in the state where the operating lever 71 is located at the dead end of the operation by moving the paper P not shown in the counter-transfer direction. When the front end R110*b* of the engaging tooth R110 comes into contact with the inclined face 721*b* of the rack part 721 in this state by rotating the engaging tooth R110 of the pinion R11 relative to the rack part 721, the floating engaging member 72 is kicked diagonally upward from the pinion R11 to take the retreating attitude ya and goes into the normal use state y where the pinion R11 runs idle relative to the rack part 721. Even when the operating lever 71 is not located at the dead end of the operation, if the auxiliary roller R1 is rotated by moving the paper P in the counter-transfer direction from the engaging attitude xa in which the rack part 721 engages with the pinion R11, the floating engaging member 72 takes the retreating attitude as in the above-mentioned manner. That is, the switching mechanism Z of the present invention has a function of switching a series of operations of operating the operating part 7 between the feeding state x and the normal use state y so that the operation goes into the feeding state x where the feeding mechanism X capable of rotating the pinion R11 only during the upward rotation of the operating lever 71 operates and goes into the normal use state y when the operating lever 7 is rotated downward and the auxiliary roller R1 is rotated irrespective of the operating part 7.

By repeatedly operating the operating part 7 in this manner, the transfer face RTa of the transfer roller RT is brought into contact with the surface of the paper P in the state where the paper P is sandwiched between the transfer tool main unit 1 and the transferred object supporter 2 (refer to FIG. 5A), thereby gradually moving the paper P in the counter-transfer direction by a certain dimension.

Also when the paper P is moved in the counter-transfer direction depending on the above-mentioned feeding mechanism X and when the transfer tool A is moved in the transfer direction in the normal use state y, with the operation of the transfer tool A of transferring the glue Tb on the paper P in the transfer direction, it is set so that the auxiliary roller R1 may rotate in sync with the transfer roller RT while bringing the backing face R1*a* into contact with the back face of the paper P and the pair of second auxiliary rollers R2*a* and R2*b* may rotate in sync with each other due to the friction with the paper P for the stable transfer operation. By setting the arm part 6 of the transferred object supporter 2 so as to perform the balancing operation with respect to the base 5, it is set so that the auxiliary roller R1 and the second auxiliary roller R2*b* provided at the arm part 6 are appropriately separated from the transfer roller RT and the second auxiliary roller R2*a* provided at the transfer tool main unit 1 and at least the backing face R1*a* of the auxiliary roller R1 comes into contact with the back face of the paper P at the transfer. Furthermore, when the auxiliary roller R1 performs the balancing operation, the pinion R11 also performs the balancing operation as a matter of course and a relative position between the pinion R11 and the operating part 7 shifts slightly. However, since the track created by the auxiliary roller R1 at the balancing operation is set to be closely analogous to the track created by the front end of the operating lever 71, the floating engaging member 72 supported by the front end of the operating lever 71 can engage with the pinion R11 at all times. At the transfer, the tape glue T sandwiched between the transfer face RTa and the paper P is fed from the unwinding spool SP1 rotating with the unwinding gear G1 due to the frictional force and the glue Tb pasted to one face of the tape main body Ta is attached to the paper P, and at the same time, the winding spool SP2 rotates with the winding gear G2 reversely rotating with the unwinding gear G1, thereby winding the tape main body Ta having no glue Tb on one face around the winding spool SP2. Then, after transfer on a desired area of the paper P, by stopping the applying of the grasping force in the direction of bringing the transferred object supporter 2 closer to the transfer tool main unit 1, the transferred object supporter 2 rotationally moves in the direction of separating from the transfer head H to reach the non-use position (P) (refer to FIG. 5B).

Figure 9:
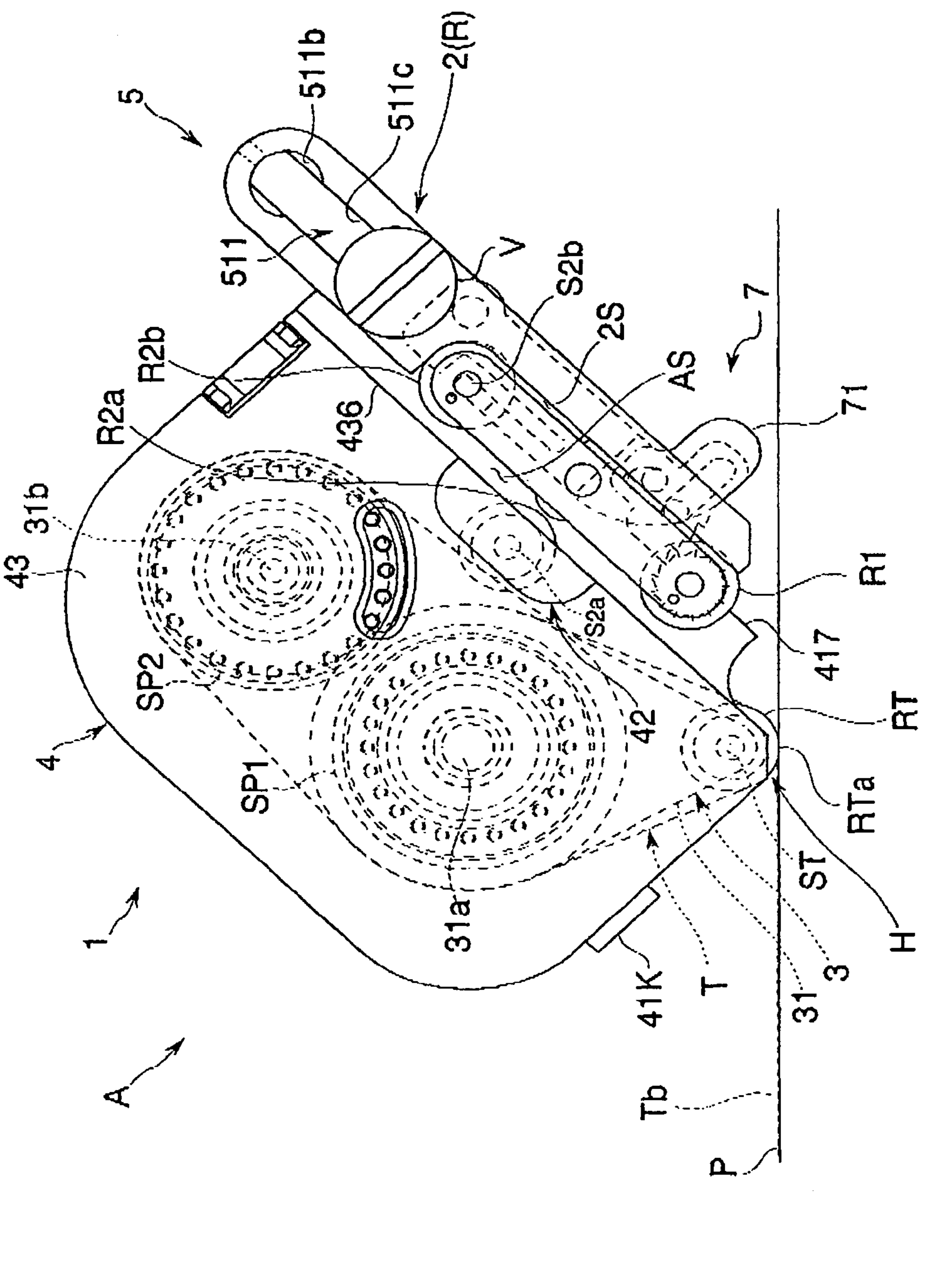
FIG. 9 is a side view in accordance with the first embodiment.

On the other hand, when the shaft 418 is located at the second large diameter part 511*b* of the bearing part 511, the transferred object supporter 2 is located so as to be able to cover the front end of the transfer head H, and however, when the shaft 418 is slidably moved from this state toward the first large diameter part 511*a* along the extending direction of the groove 511*c* of the bearing part 511, as shown in FIG. 9, the transferred object supporter 2 takes a transfer head exposing position (R) at which the front end of the transfer head H is exposed. In this sate, by bringing the transfer head H into contact with the paper P and moving the transfer tool A in the transfer direction, transfer can be performed in the same using mode as in the publicly known transfer tool A.

With such configuration, the transfer tool A in accordance with this embodiment has the feeding mechanism X of feeding the glue Tb as a transferring object to the paper P as a transferred object through the transfer face RTa by a certain dimension in the use state (O) and the switching mechanism Z of selectively switching between the feeding state x where the feeding mechanism X operates and the normal use state y where the feeding state x is released still in the use state (O).

Thus, since it is possible to continuously switch, in the switching mechanism Z, between the feeding state x where the glue Tb can be transferred on the paper P by a certain dimension using the feeding mechanism X and the mode of transferring the glue Tb of any dimension as in the conventional transfer tool, that is, the normal use state y, even in the feeding state x where the feeding mechanism X can operate, the switching mechanism Z selectively switch from the feeding state x to the normal use state y still in the use state (O), and therefore, like the conventional transfer tool, this transfer tool can arbitrarily switch to the mode of transferring the glue Tb of any dimension without leaving the transfer face RTa of the transfer head H from the paper P. Moreover, for example, when a thin paper is used as the transferred object, the conventional transfer tool may break the paper P due to the force of pressing the vicinity of the end of the paper P with hand and the force of moving the transfer face of the transfer tool in a predetermined transfer direction, whereas the transfer tool A in this embodiment can transfer the glue Tb on the paper P by the feeding mechanism X by a certain dimension and thus, can stably transfer the glue Tb without breaking the paper P.

Furthermore, since the transfer tool A in this embodiment is provided with the transfer roller RT having the transfer face RTa capable of rotating at the transfer of the transfer head H, smooth transfer can be realized by further reducing the force applied to the paper P when the transfer face RTa is moved in the transfer direction.

Since the transfer tool A is provided with the rotatable auxiliary roller R1 having the backing face R1*a* which comes into contact with the back face of the paper P in the state where the transfer face RTa of the transfer head H is in contact with the paper P, it is possible to properly bring the paper P into contact with the transfer face RTa to obtain good transfer property and accurately send the paper P in the counter-transfer direction. Furthermore, since the auxiliary roller R1 is disposed as opposed to the transfer face RTa of the transfer head H and the paper P is sent in the counter-transfer direction with being pressed from the front and back sides, more excellent transfer property can be acquired. Furthermore, the transferred object supporter 2 is rotatably attached to the transfer tool main unit 1 and the transfer roller R1 is attached through the arm part 6 and performs balancing operation. In this manner, it is configured so as to relatively separate the backing face R1*a* from the transfer face RTa and therefore, the paper P can be properly supported from the front and back sides irrespective of the thickness of the paper P.

Since the feeding mechanism X provided in the transfer tool A draws out the glue Tb as the transferring object from the transfer face RTa of the transfer head H by rotating the auxiliary roller R1 by a certain angle due to the operating force and moving the paper P in the counter-transfer direction by a certain dimension to feed the glue Tb to the paper P by the certain dimension, the force applied to the paper P when the glue Tb is transferred by the feeding mechanism X can be made only the force of pressing the paper P in the thickness direction, the frictional force between the paper P and the transfer face Rta and the frictional force between the back face of the paper P and the backing face R1*a*. Thus, it is possible to feed the paper P in the state where the force applied to the paper P is reduced more desirably. Furthermore, since the transfer tool can go into the feeding state x only in the use state (O) as the state where the transfer roller RT operates together with the auxiliary roller R1, a wrong operation of transferring the glue Tb by the feeding mechanism X when the transfer roller RT does not operate together with the auxiliary roller R1 is effectively prevented. Here, in this embodiment, the "certain angle" by which the auxiliary roller R1 is rotated is set to be an angle by which four engaging teeth R110 of the pinion R11 rotating with the auxiliary roller main unit R10 are rotated. And, by constituting the switching mechanism Z so as to switch between the feeding state x where the auxiliary roller R1 can rotate by the certain angle depending on the above-mentioned feeding mechanism X and the normal use state y where the auxiliary roller R1 can rotate without depending on the feeding mechanism x, the above-mentioned feeding mechanism X can be operated more stably.

In the configuration of the transfer tool A, since the inserting space AS is formed between the transferred object supporter 2 and the transfer tool main unit 1, the transfer head H is disposed so that at least the transfer face RTa is exposed within the inserting space AS from the transfer tool main unit 1 and the auxiliary roller R1 is disposed so that the backing face R1*a* is exposed from the transferred object supporter 2 to insert the paper P into the inserting space AS, the paper P can be suitably moved in the counter-transfer direction while being supported by the transfer face RTa and the backing face R1*a* more stably. In addition, by providing the operating part 7 capable of rotating the auxiliary roller R1 by the operating force at the base 5 of the transferred object supporter 2, it is effectively prevented to provide the operating part 7 at the transfer tool main unit 1 which stores various parts therein and tends to be complicated in mechanism and also it becomes possible to set the operating part 7 at the position to be easily handled by an index finger, for example, when the transfer tool A is grasped with hand. Since the switching mechanism Z is configured so as to switch between the feeding state x where the operating part 7 can rotate the auxiliary roller R1 by the certain angle and the normal use state y where the auxiliary roller R1 can rotate without depending on the operating part 7, the transfer tool A having the feeding mechanism X and the switching mechanism Z can be realized merely by adding the operating part 7.

By constituting the auxiliary roller R1 of the auxiliary roller main unit R10 and the pinion R11 in a specific configuration in which the operating part 7 rotates the auxiliary roller R1, the operating part 7 with simple configuration can stably rotate the auxiliary roller R1. Furthermore, since the operating part 7 consists of the operating lever 71 and the floating engaging member 72 forming the rack part 721 to take the engaging attitude xa or the retreating attitude ya, the operating part 7 can be constituted by a small number of parts. Since the operating lever 71 is pivotally attached to the base 5 in the pivot hole 711 and supports the floating engaging member 72 by the supporting shaft 712 formed at the front end as the other end, the operating lever 71 realizes high accuracy with simple configuration by utilizing rotating movement and the number of parts forming the operating part 7 is effectively reduced. Furthermore, since the direction of rotating the floating engaging member 72 around the pivot hole 711 of the operating lever 71 substantially corresponds to the tangential direction of the pinion R11, accurate operation of the operating part 7 by the rotation of the operating lever 71 can be realized. Since the switching mechanism Z serves to switch between the feeding state x where the floating engaging member 72 takes the engaging attitude xa of engaging with the pinion R11 and the normal use state y where the floating engaging member 72 takes the retreating attitude ya, the operating part 7 can be stably operated by switching between the feeding state x and the normal use state y only through the switching of the attitude of the floating engaging member 72.

Since the switching mechanism Z is constituted so that the floating engaging member 72 takes the engaging attitude xa when the pinion R11 rotates the operating lever 71 upward in the predetermined operating direction to rotate the backing face R1*a* of the auxiliary roller R1 in the counter-transfer direction, whereas the floating engaging member 72 takes the retreating attitude ya when the pinion R11 rotates the operating lever 71 downward, the wrong operation of the reversely rotating the pinion R11 in conjunction with the downward rotation of the operating lever 71 can be effectively prevented. In its detailed configuration, the supporting shaft 712 supporting the floating engaging member 72 is provided at the front end as the other end of the operating lever 71, the attitude switching hole 722 supported by the supporting shaft 712 is formed on the floating engaging member 72, the attitude switching hole 722 is formed as a long hole so as to set the engaging position 722*a* on one end side of the hole and set the retreating position 722*b* on the other end side of the hole. And, since the floating engaging member 72 takes the engaging attitude xa by locating the supporting shaft 712 at the engaging position 722*a* when the operating lever 71 is rotated upward and the floating engaging member 72 takes the retreating attitude ya by locating the supporting shaft 712 at the retreating position 722*b* when the operating lever 71 is rotated downward, the operating part 71 can function as the switching mechanism Z merely by devising the shape of the hole supported by the operating lever 71 without adding any part.

Furthermore, since the elastic deforming part 713 is formed at the operating lever 71, excellent elasticity, that is, suitable operability is provided when the operating lever 71 is operated upward, and since the elastic deforming part 713 restores from the elastically deformed state when the finger leaves the operating lever 71, thereby rotating the operating lever 71 downward, the operating lever 71 can be repeatedly operated merely by rotating the operating lever 71 upward with the finger. That is, it is possible to form the operating lever so as to be operable with one finger.

Furthermore, since the feeding mechanism X is constituted so that in the feeding state x where the floating engaging member 72 takes the engaging attitude xa, when the transmitting face 721*a* of the rack part 721 moves in the direction of bringing the transmitting face 721*a* of the transmitting tooth 721*c* into contact with the engaging face R110*a* of the engaging tooth R110, the pinion R11 rotates in the counter-transfer direction in conjunction with the rack part 721 while the floating engaging member 72 takes the engaging attitude xa and the switching mechanism Z is constituted so that when the engaging tooth R110 of the pinion R11 moves and the front end R110*b* of the engaging tooth R110 comes into contact with the inclined face 721*b* of the transmitting tooth 721*c* in the feeding state x, the rack part 721 is separated from the pinion R11 and the floating engaging member 72 switches from the engaging attitude xa to the retreating attitude ya, thereby that the feeding state x is switched to the normal use state y where the pinion R11 runs idle relative to the rack part 721, even in the engaging attitude xa in which the rack part 721 of the floating engaging member 72 engages with the pinion R11, the engaging attitude xa can be suitably switched to the normal use state y as the retreating attitude ya. Furthermore, merely by devising the shape of the pinion R11 and the rack part 721, such function can be realized without adding a separate member.

In addition, since the transfer tool A in accordance with this embodiment includes the transfer tool main unit 1 and the transferred object supporter 2, the inserting space AS into which the paper P between the transferred object supporter 2 and the transfer tool main unit 1 can be inserted is formed and the feeding mechanism X operates in the state where the transfer face RTa is stopped and pressed to the paper P in the inserting space AS, the paper P can be continuously transferred by the feeding mechanism X by the certain dimension, with being sandwiched between the transfer head H and the transferred object supporter 2 in the inserting space AS, for example, held with hand.

Figure 10:
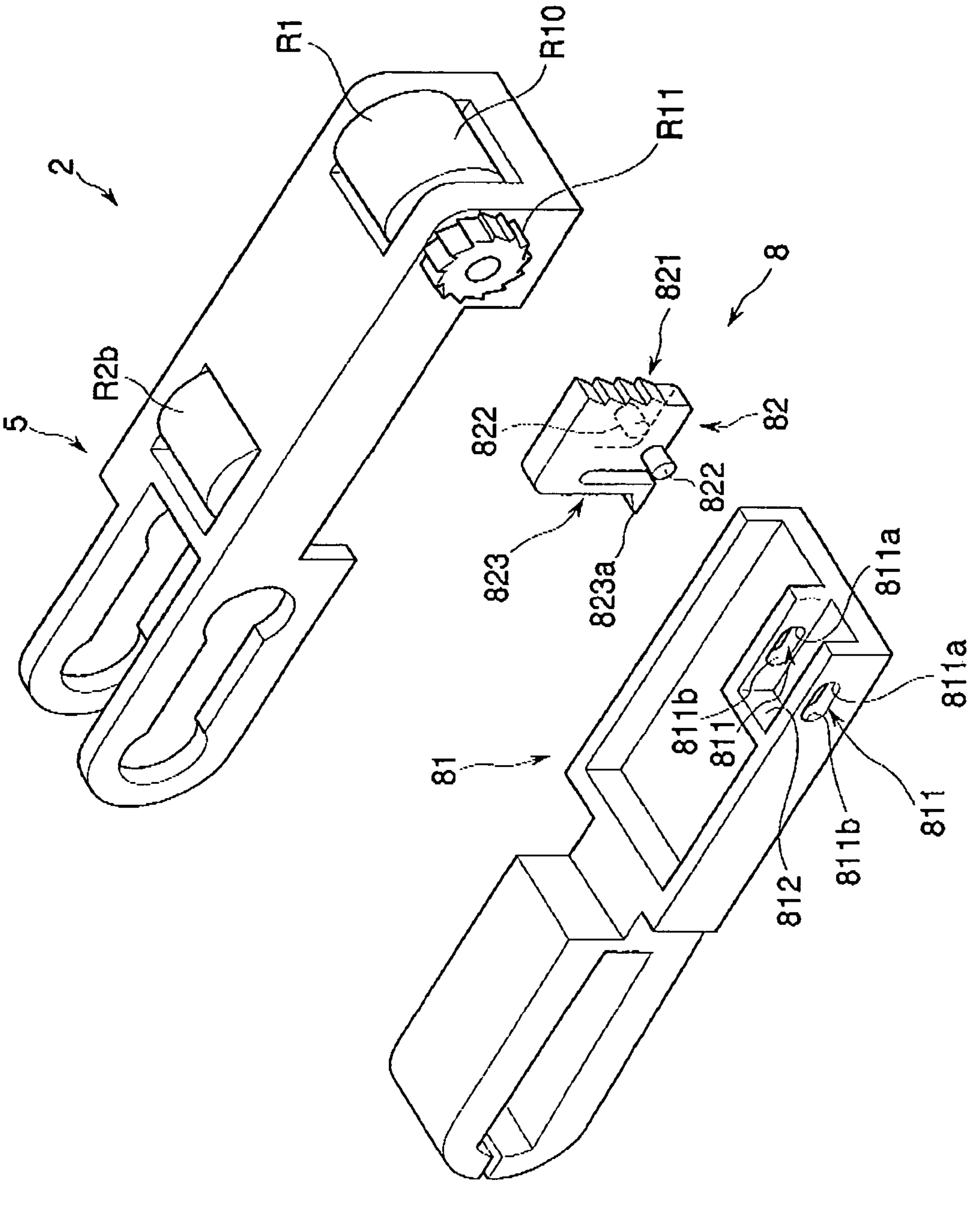
FIG. 10 is a perspective view in accordance with a modification of the first embodiment.

FIG. 10 shows the mode in which the transferred object supporter 2 is provided with an operating part 8 as a modification of this embodiment.

This operating part 8 consists of an operating lever 81 having the same rotating shaft as the transferred object supporter 2 and a floating engaging member 82, supporting shafts 822 provided at both sides of the floating engaging member 82 are attached to attitude switching holes 811 provided on the operating lever 81 by an interlocking method or the like to assemble the operating lever 81 to the base 5 from below, and in the assembled state, the position of the floating engaging member 82 is set so that the supporting shafts 822 are located at engaging positions 811*a* of the attitude switching holes 811 to allow the rack part 821 of the floating engaging member 82 to engage with the pinion R11. Furthermore, by moving the paper P in the counter-transfer direction, when the auxiliary roller R1, that is, the pinion R11 is rotated without depending on the operation of the operating lever 81, the engagement of the pinion R11 with the rack part 821 is released and the floating engaging member 82 moves to the retreating position 822*b* at which the supporting shafts 822 are located in the attitude switching holes, and however, by bringing the front end 823*a* of the elastic deforming part 823 formed on the floating engaging member 82 into contact with a contact face 812 of the operating lever 81, elastic force in the direction of slidingly moving the supporting shafts 822 to the engaging positions 811*a* of the attitude switching holes 811 is accumulated.

With such configuration, the floating engaging member 82 can be stably operated so as to suitably follow the operation of the operating lever 81 and the position of the supporting shafts 822 of the floating engaging member 82 can be suitably switched between the engaging positions 811*a* and the retreating positions 811*b* of the attitude switching holes 811 if needed.

Subsequently, a transfer tool A in accordance with a second embodiment of the present invention will be described with reference to FIG. 11 to FIG. 14.

In this embodiment, the same reference numerals are given to components similar to those in the first embodiment and detailed description thereof is omitted.

Figure 11:
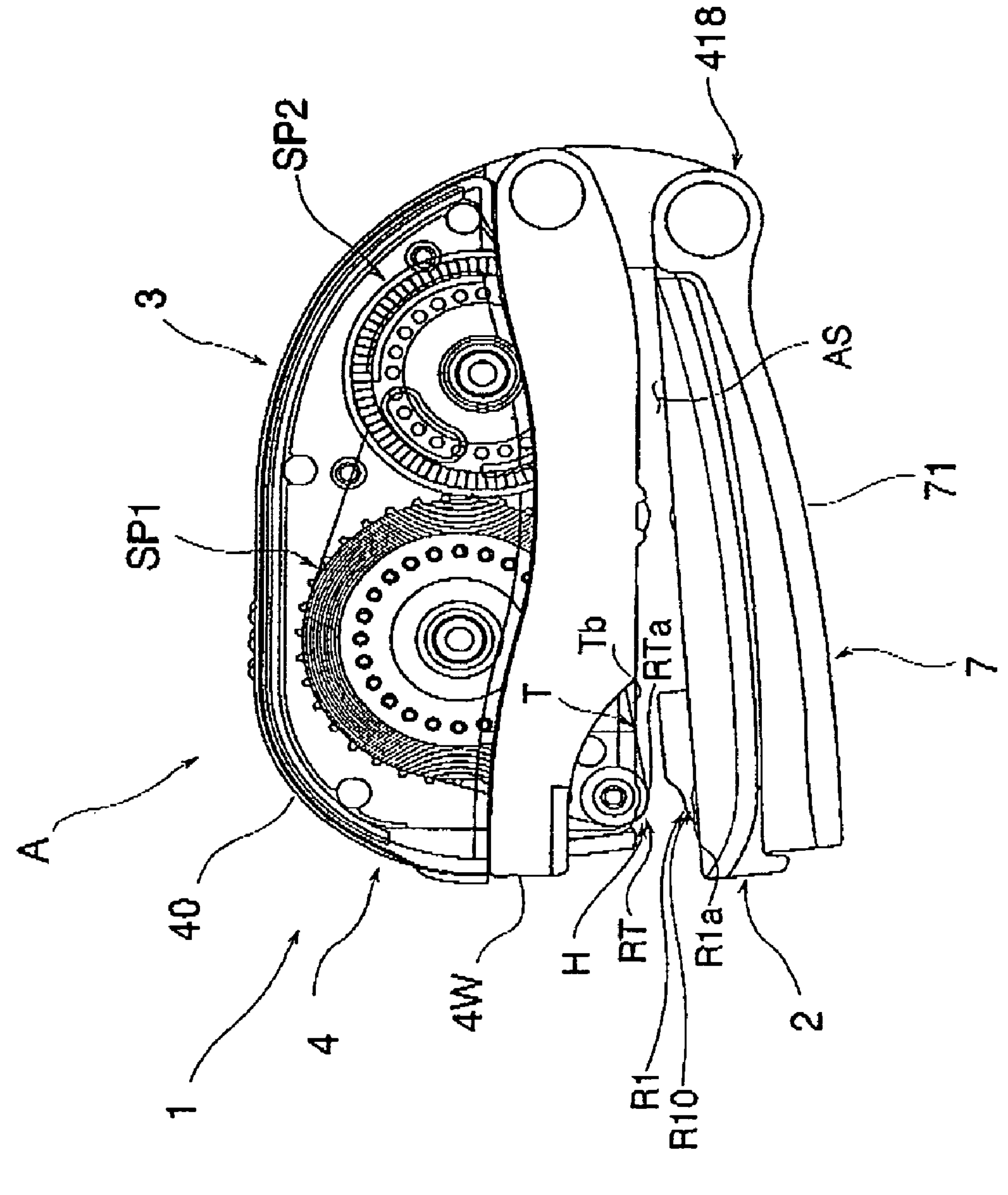
FIG. 11 is an overall view of a transfer tool in accordance with a second embodiment of the present invention.
Figure 12:
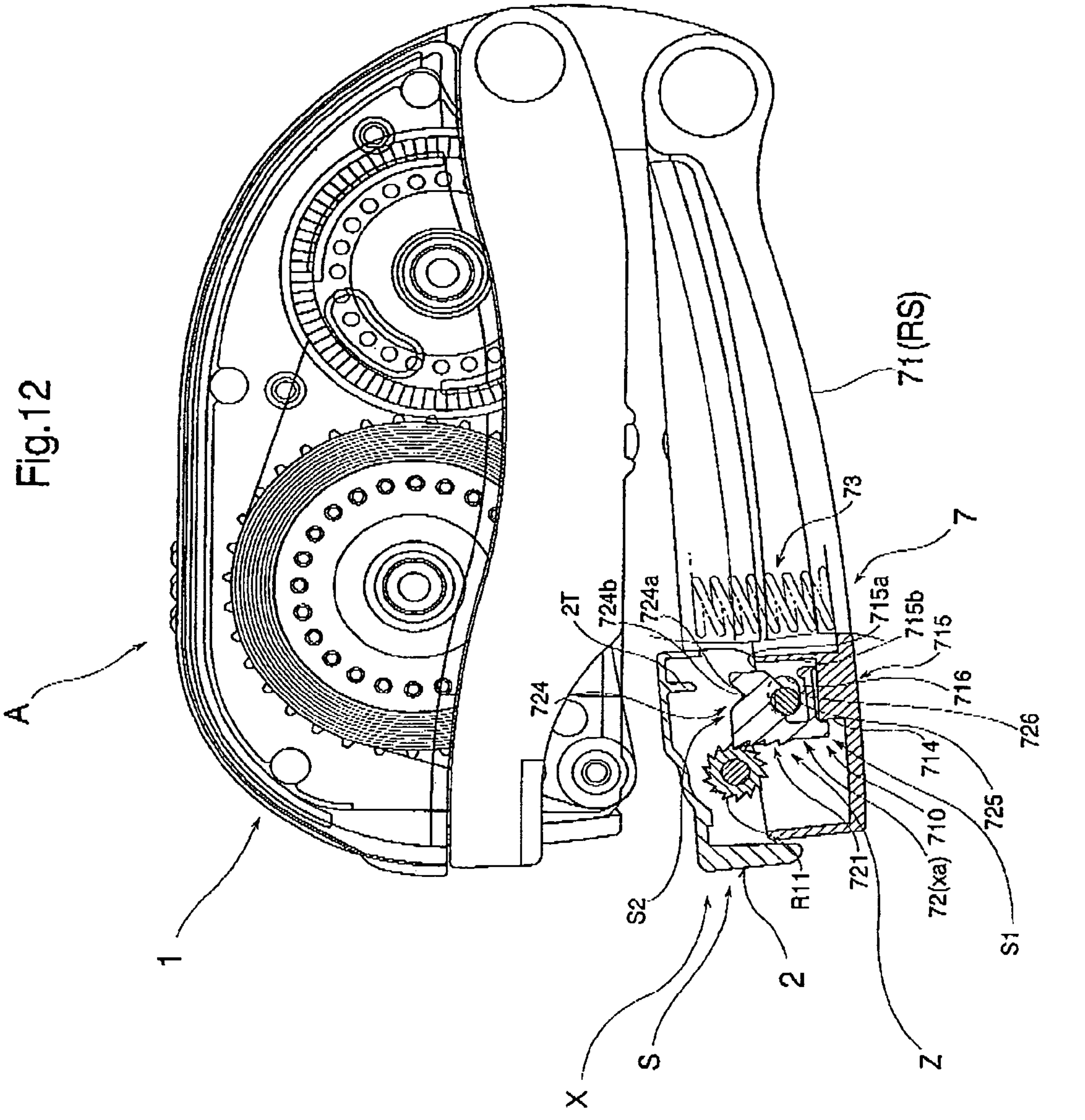
FIG. 12 is a sectional view of a main part in accordance with the second embodiment.
Figure 13:
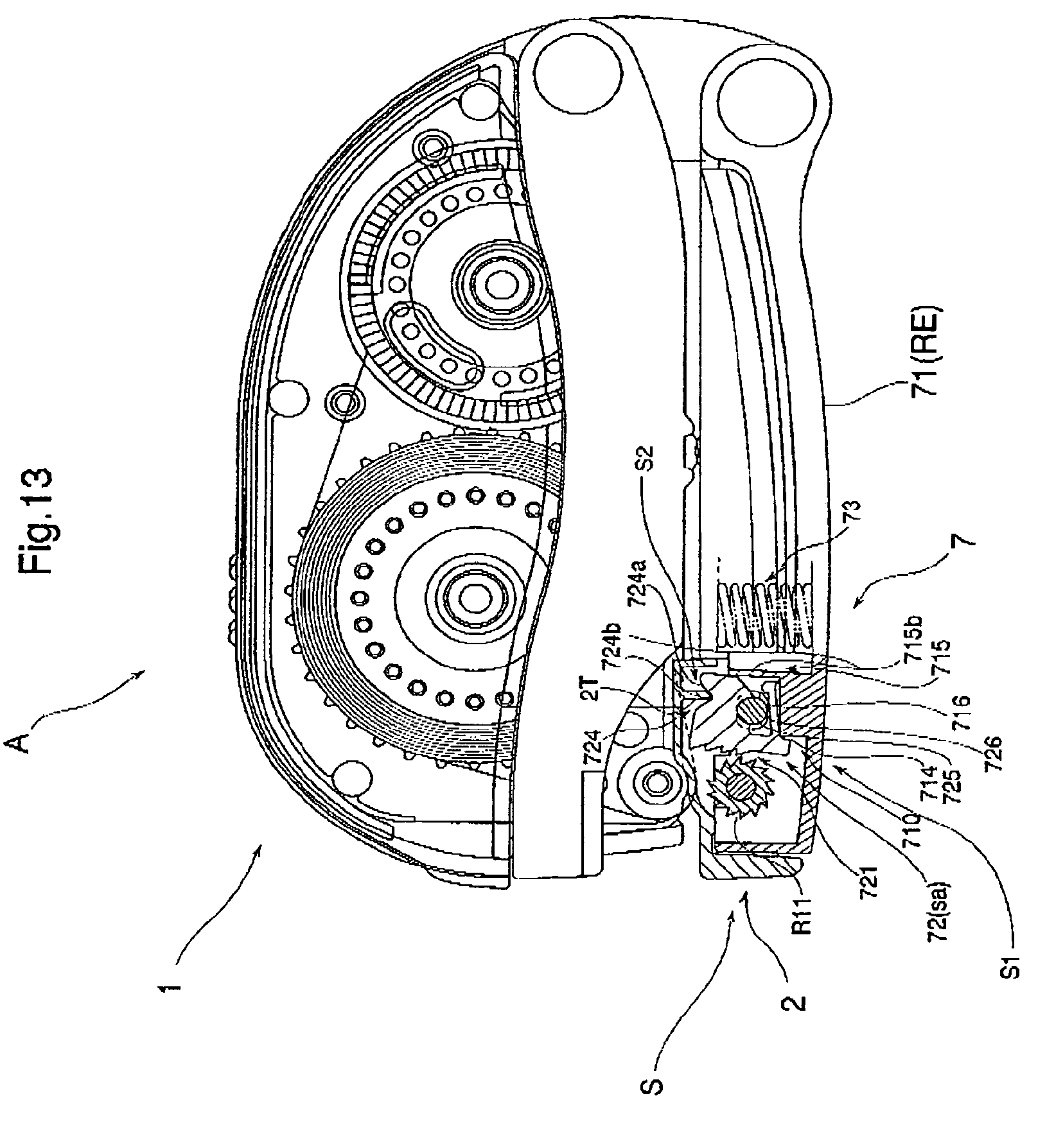
FIG. 13 is a configuration explanation view in accordance with the second embodiment.

As main components, the transfer tool A, as shown in FIG. 1, has the transfer tool main body 1 consisting of the case 4 which stores the tape glue T and a feeding mechanical part feeding the tape glue T therein and a frame member 4W which holds the case 4 and can rotate relative to the case 4, the transferred object supporter 2 for inserting the paper P between the carrier 2 and the frame member 4W at the transfer of the glue Tb and the operating part 7 having the operating lever 71 rotatably attached to the transferred object supporter 2. The transferred object supporter 2, as shown in FIG. 11 to FIG. 13, has the inserting space AS with a predetermined height formed between the carrier 2 and a lower end of the frame member 4W in the forward-rearward direction to insert the paper P (not shown) thereto.

Here, the transfer tool A in accordance with this embodiment further includes a releasing mechanism S of separating the rack part 721 of the floating engaging member 72 forming the operating part 7 from the pinion R11 described later so that they may not be in contact with each other in the normal use state y in addition to the feeding mechanism X and the switching mechanism Z described in detail in the first embodiment.

Hereinafter, a specific configuration of the transfer tool A will be described in detail.

The transfer tool main unit 1 has the case 4 and the frame member 4W as main components.

The case 4 takes a substantial halved configuration formed of the refill cartridge 3 and the case main unit 40. The transfer head H is attached to the front end of the refill cartridge 3. And, the tape glue T as a consumable part, the unwinding spool SP1, the winding spool SP2 and the transfer head H which are part of the feeding mechanism part for supplying the tape glue T to the paper P as replacement parts can be exchanged with new ones with being attached to the refill cartridge 3. The case main unit 40 is generally configured so that only the refill cartridge 3 can be exchanged without separating from the frame member 4W and the transferred object supporter 2 and holds a non-replacement part as part of the feeding mechanism part for supplying the tape glue T to the paper P.

As shown in FIG. 11, the frame member 4W has a function of holding the case 4 and making the transfer tool A operable and a function of disassembling the case 4 into the case main unit 40 and the refill cartridge 3. Specifically, the frame member 4W shaped like a frame which is consecutively opened in the vertical direction is an integral molding product made of synthetic resin and is thicker and more rigid than the case 4. The case main unit 40 is rotatably supported by the frame member. At the lower end of the frame member 4W is provided the shaft 418 rotatably supporting the transferred object supporter 2 and the operating lever 71 described later. The transfer roller RT in the transfer head H is exposed from the lower end of the frame member 4W, thereby locating the transfer face RTa in the inserting space AS.

The transferred object supporter 2, as shown in FIG. 11 and FIG. 12, is rotatably attached to the transfer tool main unit 1 to form the inserting space AS together with the transfer tool main unit 1.

As shown in FIG. 11, the transferred object supporter 2 and the frame member 4W sandwich the paper P as the transferred object therebetween to transfer the glue Tb on the paper P and are configured so as to rotate relative to the case 4. Specifically, the transferred object supporter 2, as shown in FIG. 11 to FIG. 13, has the inserting space AS with a predetermined height formed between the carrier 2 and a lower end of the frame member 4W in the forward-rearward direction to insert the paper P thereto. The auxiliary roller R1 is located near the front end of the transferred object supporter 2. Furthermore, the auxiliary roller R1 has the auxiliary roller main unit R10 as the backing face which is exposed to the inserting space AS and comes into contact with the back face of the paper P and the pinion R11 rotating together with the auxiliary roller main unit R10. Furthermore, a protrusion 2T as a forcing part described later is formed at the position opposed to a notch 724 as a cam face of the floating engaging member 72 described later on the lower face of the transferred object supporter 2.

The operating part 7, as shown in FIG. 12, mainly has the operating lever 71 coaxially attached to the shaft 418 of the transfer tool main unit 1 so as to substantially cover the lower side of the transferred object supporter 2 and stores the floating engaging member 72 and a coil spring 73 in the inner space formed between the transferred object supporter 2 and the operating lever 71. The above-mentioned auxiliary roller R1 is also accommodated in the inner space.

As described above, the operating lever 71 is attached so as to substantially cover the lower side of the transferred object supporter 2 and forms a floating engaging member supporting part 710 supporting the floating engaging member 72 in the inner space formed when being attached to the transferred object supporter. The floating engaging member supporting part 710 consists of a supporting base 714 formed in the lower portion of the operating lever and a supporting wall 715 rising from the supporting base 714 substantially in the character of C in a top view. The supporting base 714 is formed so as to be capable of contacting against the lower face of the below-mentioned elastic deforming part 726 formed in the lower portion of the floating engaging member 72. The supporting wall 715 has a pair of side walls 715*a* which rises so as to sandwich the floating engaging member 72 from its thickness direction and a rear wall 715*b* interposed between the side walls 715*a* and an attitude switching hole 716 as an attitude switching part for movably storing a below-described supporting shaft 725 of the floating engaging member 72 in the forward-rearward direction is formed on the side wall 715*a*. By supporting the supporting shaft 725 of the floating engaging member 72 by the attitude switching hole 716, it is possible to switch the attitude of the floating engaging member 72 among the engaging attitude xa in which the floating engaging member 72 engages with the pinion R11, the retreating attitude ya in which the floating engaging member 72 does not engage with the pinion and a releasing attitude sa in which the floating engaging member 72 is separated from the pinion R11 so as not to contact against each other.

The floating engaging member 72 forms the rack part 721 which engages with the pinion R11, thereby rotating the backing face R1*a* of the auxiliary roller R1 in the counter-transfer direction, at the position where the floating engaging member is in contact with the pinion R11. The supporting shaft 725 which can be accommodated in the above-mentioned attitude switching hole 716 is formed at the center of the floating engaging member 72 by protruding in the thickness direction of the floating engaging member 72. Furthermore, the protruding elastic deforming part 726 which can be supported by the above-mentioned supporting base 714 is formed at the lower side of the floating engaging member 72 and has the effect of appropriately restoring the floating engaging member 72 to the engaging attitude xa by elastically deforming the elastic deforming part 726 when the floating engaging member 72 takes the retreating attitude ya or the releasing attitude sa. Describing in detail, a front end of the elastic deforming part 726 is formed so as to further protrude downward and by mounting the floating engaging member 72 in the state where the protruding part is brought into contact with the supporting base 714 to slightly lift the front end of the elastic deforming part 726, the whole floating engaging member 72 is slightly inclined relative to the pinion R11 to previously apply an elastic urging force of certain strength to the pinion R11 and therefore, the rack part 721 can be satisfactorily engaged with the pinion R11. On the other hand, the notch 724 as a cam face in the shape of a character V in a side view, which can come into contact with the above-mentioned protrusion 2T, is formed on the upper face of the floating engaging member 72. An inclined face which can contact against the protrusion 2T in the V-shaped notch 724 is defined as a sliding contact face 724*a* and a portion forming the bottom of the V-shaped notch is defined as a positioning part 724*b*. In this embodiment, the rack part 721 and the pinion R11 have the same shape as those in the first embodiment.

The coil spring 73 is inserted between the transferred object supporter 2 and the operating lever 71 and is elastically urged in the direction of separating the operating lever 71 from the transferred object supporter 2. However, as long as it is elastically urged, the coil spring is not limited to the coil spring 73 in this embodiment, and the other configuration in which a plate spring or another member having elasticity is appropriately attached may be adopted.

With the above-mentioned configuration, as in the first embodiment, the transfer tool A is comprised of the feeding mechanism X for forming the feeding state x where the glue Tb is transferred on the paper P by a certain dimension by rotating the operating lever 7 to engage the floating engaging member 72 with the pinion R11 and rotating the pinion R11 by a certain angle and the switching mechanism z for switching from the feeding state x by the feeding mechanism X to the normal use state y by rotating the pinion R11 when the paper P is moved with a finger, for example, to move the floating engaging member 72 and releasing the feeding state x as necessary.

However, the transfer tool A in this embodiment includes, in addition to the above-mentioned feeding mechanism X and the switching mechanism Z, the releasing mechanism S for separating the rack part 721 from the pinion R11 so as not to contact against each other in the normal use state y by moving the floating engaging member 72 from the engaging attitude xa in which the pinion R11 engages with the rack part 721 to the releasing attitude sa in which the pinion R11 is separated from the rack part 721 with the operation of the operating lever 71. Describing in detail, the releasing mechanism S is formed of a floating engaging member supporting mechanism S1 capable of supporting so as to move the floating engaging member 72 in the engaging attitude xa or the releasing attitude sa and an operating force converting mechanism S2 for converting the rotating operation of the operating lever 71 into the retreating operation from the engaging attitude xa to the releasing attitude sa. Further describing in detail, the floating engaging member supporting mechanism S1 consists of the supporting shaft 725 and the elastic deforming part 726 of the floating engaging member 72 and the floating engaging member supporting part 710 formed at the operating lever 71, and the operating force converting mechanism S2 consists of the protrusion 2T formed at the transferred object supporter 2 and the notch 724 formed at the floating engaging member 72.

Next, the operation of the releasing mechanism, which is caused by a series of rotating operations of the operating lever 71 will be described in detail using FIG. 12, FIG. 13 and FIG. 14. Here, FIG. 14(*a*) to FIG. 14(*e*) schematically show a series of operations shifting from the state shown in FIG. 12 to the state shown in FIG. 13 through the rotation of the operating lever 71.

Figure 14:
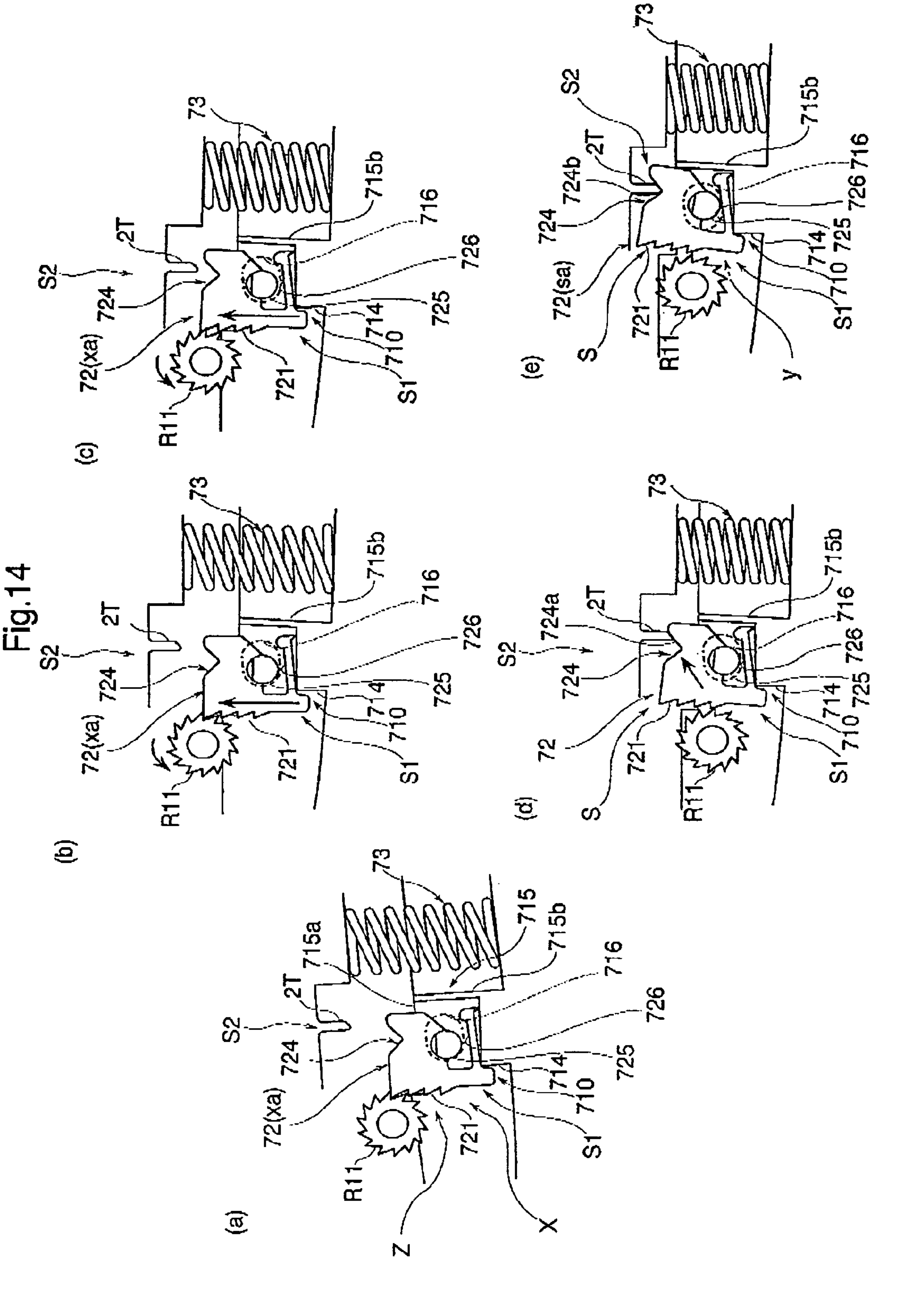
FIG. 14A to 14E are an operation explanation views in accordance with the second embodiment.

First, the state shown in FIG. 14(*a*) like FIG. 12 shows the state where the operating lever 71 is located at a rotating lead edge RS in the rotating range of the operating lever 71, for example, the state where the operating force is not applied to the operating lever 71. In this state, the upper part of the rack part 721 takes the engaging attitude xa of contacting against the pinion R11. When this state is shifted to the state shown in FIG. 14(*b*) and the state shown in FIG. 14(*c*) by rotating the operating lever 71, the floating engaging member 71 rises with the operation of the operating lever 71 which is taking the engaging attitude xa with pinion R11, thereby that the rack part 721 rotates the pinion R11. On the other hand, the notch 724 formed on the upper face of the floating engaging member 72 gradually gets closer to the protrusion 2T formed at the transferred object supporter 2. In the state shown in FIG. 14(*d*) where the operating lever 71 is rotated up to the vicinity of the rotating end edge RE, the upper end of the sliding contact face 724*a* in the notch 724 is in contact with the front end of the protrusion 2T and the rack part 721 retreats with respect to the pinion R11 while sliding the front end of the protrusion 2T along the sliding contact face 724 with the rotation of the operating lever 71. At this time, since the elastic deforming part 726 is supported with being substantially fixed at the supporting base 714, the supporting shaft 725 moves along the attitude switching hole 716 while the elastic deforming part 726, especially its proximal end is elastically deformed. In the state shown in FIG. 14(*e*) or FIG. 13 where the operating lever 71 reaches the rotating end edge RE due to the operating force, the front end of the protrusion 2T comes into contact with the positioning part 724*b* corresponding to the bottom of the notch 724, thereby positioning the floating engaging member 72 at the releasing attitude sa. In this state, the floating engaging member 72 is positioned in the state where the rack part 721 is completely separated from the pinion R11 so as not to contact against each other. In other words, in the releasing attitude sa, the rack part 721 is completely retreated from the rotating range of the pinion R11.

On the other hand, when the user releases the operating force, for example, by reducing the grasping power from the state shown in FIG. 14(*e*) or FIG. 13 where the operating lever 71 is located at the rotating end edge RE, the operating lever 71 restores from the rotating end edge RE to the rotating lead edge RS due to the elastic repulsive force of the coil spring 73. At this time, the floating engaging member 72 positioned by the positioning part 724*b* moves so that the front end of the protrusion 2T slides along the sliding contact face 724*b* and then, the notch 724 is separated from the protrusion 2T and the floating engaging member 72 takes the engaging attitude xa while the supporting shaft 725 moves along the attitude switching hole 716 due to the elastic repulsive force of the elastic deforming part 726 in the floating engaging member and returns to a state shown in FIG. 14(*a*) and FIG. 12.

As described above, the transfer tool A in accordance with the second embodiment of the present invention has the releasing mechanism S of separating the rack part 721 from the pinion R11 so as not to contact against each other. Thus, in the normal use state y, it is possible to effectively prevent the occurrence of strike sound caused by striking of the pinion R11 against the rack part 721 when the pinion R11 is rotated. Furthermore, by preventing the striking of the rack part 721 against the pinion R11, wear of the pinion R11 and the rack part 721 of the floating engaging member 72 can be prevented, which contributes to improvement in the durability of the transfer tool A itself.

By adopting the configuration in which the releasing mechanism S moves the floating engaging member 72, since the releasing mechanism S is suitably set without changing the setting of the auxiliary roller R1 and the pinion R11, the operating stability of the auxiliary roller can be effectively ensured.

Furthermore, since the floating engaging member 72 takes the releasing attitude sa in the vicinity of the rotating end edge RE in the rotating range of the operating lever 71, the releasing mechanism S can be simply and suitably operated from the state where the operating lever 71 performs the operation by the feeding mechanism X without requiring any special operation.

In addition, since the coil spring 73 as an elastic member for accumulating the elastic repulsive force in the reverse direction when the operating lever 71 is rotated is attached, the operating lever 71 can be operated at a desired timing to take the releasing attitude sa and switch from the releasing attitude sa to the engaging attitude xa at a desired timing.

In particular, the floating engaging member supporting mechanism S1 capable of movably supporting the releasing mechanism S so that the floating engaging member 72 may take the engaging attitude xa and the releasing attitude sa and the operating force converting mechanism S2 for converting the operation of rotating the operating lever into the retreating operation of the floating engaging member 72 from the engaging attitude xa to the releasing attitude sa are provided. With such configuration, since the floating engaging member supporting mechanism S1 for movably supporting the floating engaging member 72 is separated from the operating force converting mechanism S2 for moving the floating engaging member 72 between the engaging attitude xa and the releasing attitude sa, the moving range of the floating engaging member 72 and the timing of moving the floating engaging member 72, respectively, can be suitably set.

Describing in detail, although the simple configuration in which the floating engaging member supporting mechanism S1 is formed of the supporting shaft 725 and the attitude switching hole 716 is adopted, the floating engaging member 72 can be accurately moved. Furthermore, since the elastic deforming part 726 which accumulates the elastic repulsive force of returning the floating engaging member 72 to the engaging attitude xa when the floating engaging member 72 takes the releasing attitude sa is provided, the floating engaging member 72 can be suitably moved between the engaging attitude xa and the releasing attitude sa.

On the other hand, the operating force converting mechanism S2 is constituted of the notch 724 as the cam face formed on the floating engaging member 72 and the protrusion 2T as the urging part formed as opposed to the notch 724 on the lower face side of the transferred object supporter 2, and thus the operating force applied to the operating lever 71 can be suitably converted into a change in the attitude of the floating engaging member 72. In addition, the operating force converting mechanism S2 with simple configuration is realized. With such configuration, if the shape of the floating engaging member 72 is changed as necessary, it is easy to set the attitude change operation of the floating engaging member 72. And, the positioning part 724*b* is formed at the notch 724 and at the rotating end edge RE of the operating lever 71, the floating engaging member 72 can be suitably positioned in the releasing attitude sa.

Although the embodiments of the present invention has been described, the present invention is not limited to the above-mentioned embodiments.

For example, in the first embodiment, the operating part 7 is provided at the transferred object supporter 2 and the feeding mechanism X and the switching mechanism Z act on the auxiliary roller R1, and however, by constituting the feeding mechanism X of rotating the transfer roller RT by a certain angle due to an external force, for example, by providing the operating part 7 at the transfer tool main unit 1, the glue Tb may be fed on the paper P by a certain dimension. In this case, since the force exerted on the paper P includes only the force of pressing the paper P in the thickness direction and the frictional force exerted on the area contacting against the transfer face RTa, the paper P can be fed without a break and the present invention can be applied to the transfer tool having no transferred object supporter 2. In the case where such feeding mechanism X is constituted, it is desired that the switching mechanism Z switches between the feeding state x where the transfer roller RT can be rotated by a certain angle depending on the feeding mechanism X and the normal use state y where the transfer roller RT can be rotated without depending on the feeding mechanism X.

For example, in the above-mentioned second embodiment, the floating engaging member 72 having the rack part 721 is moved, and however, the releasing mechanism S of the present invention does not necessarily select whether the rack part 721 or the pinion R11 is moved and may move both of them. Furthermore, the releasing mechanism S may bring the floating engaging member 72 into the releasing attitude sa at any position of the operating range of the operating lever 71. For example, the floating engaging member 72 may be moved to the releasing attitude sa in the vicinity of the rotating lead edge RS in the operating range of the operating lever.

Furthermore, according to the present invention, the mode of rotating the auxiliary roller or the transfer roller may be direct or indirect. That is, it includes the mode of directly rotating the auxiliary roller or the transfer roller by a certain angle with a finger. Furthermore, although the elastic deforming part is provided at the operating lever of the transferred object supporter and functions by the contact with the transfer tool main unit in this embodiment, the elastic deforming part may be set at the transfer tool main unit, for example, set at a predetermined area of the transfer tool main unit contacting against the operating lever or may be provided at the operating lever itself.

Other specific configuration of each part is limited to the above-mentioned embodiments and various modifications can be made without deviating from the scope of the present invention.

INDUSTRIAL AVAILABILITY

As described above, according to the present invention, since there are provided the feeding mechanism for feeding the transferring object to the transferred object by the certain dimension through the transfer face in the state where the transfer face is stopped and pressed with respect to the transferred object and the switching mechanism for selectively switching the feeding state by the action of the feeding mechanism and the normal use state where the feeding state is released in the state where the transfer face is in contact with the transferred object, it is possible to continuously switch between the mode of transferring the transferring object by the certain dimension and the mode of transferring the transferring object of any dimension. That is, even in the feeding state where the transferring object can be transferred by the certain dimension by the feeding mechanism, since the switching mechanism selectively switches from the feeding state to normal use state in the state where the transfer face is pressed to the transferred object, as in the conventional transfer tool, it is possible to arbitrarily switch to the mode of transferring the transferring object of any dimension without leaving the transfer face from the transferred object. Furthermore, in the conventional transfer tool, for example, when a thin paper is used as the transferred object, the transferred object can be broken by the force of pressing the vicinity of the end part of the transferred object with a hand and the force of moving the transfer face in a predetermined transfer direction. However, by using the feeding mechanism, the transferring object can be transferred on the transferred object by the certain dimension and even when a thin paper is used as the transferred object, the transferring object can be stably transferred without braking the paper.

The invention claimed is:

1. A transfer tool used when a transferring object is transferred on a transferred object comprising:

a transfer tool main unit having at least a transfer head capable of bringing the transferring object into contact with the transferred object, the transfer head having a transfer face which comes into contact with the transferred object and on which the transferring object is transferred on the transferred object at the time of the transfer of the transferring object, wherein, in a normal use state, the transferring object is transferred on the transferred object by bringing the transfer face into contact with the transferred object and moving the transfer face in a predetermined transfer direction;

a feeding mechanism for feeding the transferring object to the transferred object by a certain dimension through the transfer face in the state where the transfer face is stopped and pressed with respect to the transferred object;

a switching mechanism for selectively switching between a feeding state by the action of the feeding mechanism and the normal use state where the feeding state is released while holding the transfer face in contact with the transferred object; and a rotatable auxiliary roller having a backing face which comes into contact with a back face of a transferred face of the transferred object in the state where the transferred face of the transferred object is brought into contact with the transfer face of the transfer head at the time of the transfer.

2. A transfer tool according to claim 1, wherein the transfer head has a transfer roller including the transfer face capable of rotating at the time of the transfer.

3. A transfer tool according to claim 2, wherein the feeding mechanism can feed the transferring object to the transferred object by the certain dimension by rotating the transfer roller by a certain angle due to an external force.

4. A transfer tool according to claim 3, wherein the switching mechanism switches between the feeding state where the transfer roller can be rotated by the certain angle depending on the feeding mechanism and the normal use state where the transfer roller can rotate without depending on the feeding mechanism.

5. A transfer tool according to claim 1, wherein the auxiliary roller is provided at a position opposed to the transfer face of the transfer head.

6. A transfer tool according to claim 1, wherein the backing face of the auxiliary roller is located as opposed to the transfer face, thereby relatively separating the backing face from the transfer face.

7. A transfer tool according to claim 1, wherein, by rotating the auxiliary roller by a certain angle due to the an external force and thus moving the transferred object by the certain dimension in a counter-transfer direction reverse to the transfer direction, the transferring object is drawn from the transfer face of the transfer head such that the feeding mechanism can feed the transferring object to the transferred object by the certain dimension.

8. A transfer tool according to claim 7, wherein the switching mechanism switches between the feeding state where the auxiliary roller can be rotated by the certain angle depending on the feeding mechanism and the normal use state where the auxiliary roller can rotate without depending on the feeding mechanism.

9. A transfer tool according to claim 1, further comprising a transferred object supporter capable of contacting the transferred object from the back face corresponding to the area which is in contact with the transfer face of the transfer head in the state where the transfer face is brought into contact with the transferred object, wherein an inserting space into which the transferred object can be inserted is formed between the transferred object supporter and the transfer tool main unit, and wherein the transfer head is disposed in the inserting space so that at least the transfer face is exposed from the transfer tool main unit and the auxiliary roller is disposed so that the backing face is exposed from the transferred object supporter.

10. A transfer tool according to claim 9, wherein by rotating the auxiliary roller by a certain angle due to an external force and thus moving the transferred object by the certain dimension in a counter-transfer direction reverse to the transfer direction, the transferring object is drawn from the transfer face of the transfer head such that the feeding mechanism can feed the transferring object to the transferred object by the certain dimension, and wherein the transfer tool further comprises an operating part capable of rotating the auxiliary roller by the certain angle due to the external force and the operating part is formed at the transferred object supporter.

11. A transfer tool according to claim 10, wherein the switching mechanism switches between the feeding state where the auxiliary roller can be rotated by the certain angle by the operating part and the normal use state where the auxiliary roller can rotate without depending on the operating part.

12. A transfer tool according to claim 10, wherein the auxiliary roller has an auxiliary roller main unit capable of contacting the transferred object and a pinion rotating together with the auxiliary roller main unit, and wherein the operating part rotates the pinion by the certain angle, thereby rotating the auxiliary roller by the certain angle.

13. A transfer tool according to claim 12, wherein the operating part has an operating lever operably attached to the transferred object supporter and a floating engaging member capable of engaging with the pinion following the operation of the operating lever, wherein the floating engaging member includes a rack part engaged with the pinion, which is capable of rotating the backing face of the auxiliary roller in the counter-transfer direction, and wherein the floating engaging member is configured so as to be capable of taking an engaging attitude in which the rack part engages with the pinion and a retreating attitude in which the rack part is separated from the pinion.

14. A transfer tool according to claim 13, wherein the operating lever is rotatably and pivotally attached to the transferred object supporter at one end thereof and supports the floating engaging member at the other end thereof, and wherein a moving direction of the floating engaging member and a pivotally moving direction of the other end of the operating lever substantially corresponds to a tangent line direction of the pinion.

15. A transfer tool according to claim 13, wherein the switching mechanism switches between the feeding state where the floating engaging member takes the engaging attitude and the normal use state where the floating engaging member takes the retreating attitude.

16. A transfer tool according to claim 13, wherein the operating lever is rotatably and pivotally attached to the transferred object supporter at one end thereof and supports the floating engaging member at the other end thereof, and wherein the switching mechanism is configured such that the floating engaging member takes the engaging attitude when the operating lever is rotated in a predetermined operating direction so that the pinion rotates the backing face of the auxiliary roller in the counter-transfer direction, and the floating engaging member takes the retreating attitude when the operating lever is rotated in a direction reverse to the operating direction.

17. A transfer tool according to claim 13, wherein the operating lever is rotatably and pivotally attached to the transferred object supporter at one end thereof and supports the floating engaging member at the other end thereof, wherein a supporting shaft supporting the floating engaging member is provided at the other end of the operating lever, wherein an oval-shaped attitude switching hole supported by the supporting shaft is formed at the floating engaging member, wherein an engaging position is set at one end of the attitude switching hole and a retreating position is set at the other end of the attitude switching hole, and wherein the switching mechanism is configured such that the floating engaging member takes the engaging attitude by locating the supporting shaft at the engaging position in the attitude switching hole when the operating lever is rotated in a predetermined operating direction so that the pinion rotates the backing face of the auxiliary roller in the counter-transfer direction, and the floating engaging member takes the retreating attitude by locating the supporting shaft at the retreating position in the attitude switching hole when the operating lever is rotated in a direction reverse to the operating direction.

18. A transfer tool according to claim 17, wherein the floating engaging member includes an elastic deforming part for accumulating a force of moving the supporting shaft from the retreating position to the engaging position therein when the supporting shaft is located at the retreating position in the attitude switching hole.

19. A transfer tool according to claim 13, wherein the operating lever includes an elastic deforming part for accumulating a force rotating the operating lever in a direction reverse to a predetermined operating direction due to elastic deformation when the operating lever is rotated in the operating direction so that the pinion rotates the backing face of the auxiliary roller in the counter-transfer direction.

20. A transfer tool according to claim 13, wherein the operating lever is rotatably and pivotally attached to the transferred object supporter at one end thereof and supports the floating engaging member at the other end thereof, wherein a supporting shaft supporting the floating engaging member is formed at the other end of the operating lever, wherein an oval-shaped attitude switching hole is provided at the floating engaging member, wherein an engaging position is set at one end of the attitude switching hole and a retreating position is set at the other end of the attitude switching hole, and wherein the switching mechanism is configured such that the floating engaging member takes the engaging attitude by locating the supporting shaft at the engaging position in the attitude switching hole when the operating lever is rotated in a predetermined operating direction so that the pinion rotates the backing face of the auxiliary roller in the counter-transfer direction, and the floating engaging member takes the retreating attitude by locating the supporting shaft at the retreating position in the attitude switching hole in the normal use state when the rack part comes into contact with the pinion and the floating engaging member is repulsed due to the rotation of the pinion with the rotation of the auxiliary roller caused by moving the transferred object in the counter-transfer direction.

21. A transfer tool according to claim 13, wherein the rack part includes a plurality of transmitting teeth each having a transmitting face facing a direction of rotating the pinion and an inclined face connecting the transmitting faces, wherein the pinion includes a plurality of engaging teeth each having an engaging face capable of engaging with the transmitting face, wherein the feeding mechanism is configured so that when the transmitting teeth of the rack part operates in the direction in which the transmitting face of one of the transmitting teeth comes into contact with the engaging face of one of the engaging teeth in the feeding state where the floating engaging member takes the engaging attitude, the pinion rotates in conjunction with the rack part with the floating engaging member being taking the engaging attitude, and wherein the switching mechanism is configured so that when the engaging teeth of the pinion moves and the front end of one of the engaging teeth comes into contact with the inclined face of one of the transmitting teeth in the feeding state, the rack part is separated from the pinion and the floating engaging member switches from the engaging attitude to the retreating attitude, thereby switching to the normal use state where the pinion runs idle relative to the rack part.

22. A transfer tool according to claim 12, wherein the operating part has an operating lever operably attached to the transferred object supporter and a floating engaging member capable of engaging with the pinion following the operation of the operating lever, wherein the floating engaging member includes a rack part engaged with the pinion, which is capable of rotating the backing face of the auxiliary roller in the counter-transfer direction, and wherein the transfer tool further comprises a releasing mechanism to separate, in the normal use state, the rack part from the pinion so as not to contact with each other.

23. A transfer tool according to claim 22, wherein the releasing mechanism is configured so as to switch the floating engaging member from an engaging attitude in which the pinion engages with the rack part to a releasing attitude in which the pinion is separated from the rack part with the operation of the operating lever.

24. A transfer tool according to claim 23, wherein the releasing mechanism is configured so as to bring the floating engaging member into the releasing attitude when the operating lever is substantially positioned at an end of a rotating range of the operating lever.

25. A transfer tool according to claim 24, wherein the releasing mechanism has a floating engaging member supporting mechanism capable of movably supporting the floating engaging member so as to take the engaging attitude or the releasing attitude and an operating force converting mechanism for converting the rotating operation of the operating lever into a retreating operation to switch the floating engaging member from the engaging attitude to the releasing attitude.

26. A transfer tool according to claim 25, wherein the floating engaging member supporting mechanism has a supporting shaft formed at one of the operating lever and the floating engaging member, and an attitude switching part formed at the other of the operating lever and the floating engaging member, wherein the supporting shaft supports the floating engaging member, and wherein the attitude switching part movably supports the supporting shaft so that the floating engaging member may take the engaging attitude and the releasing attitude.

27. A transfer tool according to claim 25, wherein the floating engaging member supporting mechanism has an elastic deforming part for accumulating a repulsive force returning the floating engaging member from the releasing attitude to the engaging attitude when the floating engaging member takes the releasing attitude.

28. A transfer tool according to claim 25, wherein the operating force converting mechanism has a cam face provided at one of the transferred object supporter and the floating engaging member, and an urging part provided at the other of the transferred object supporter and the floating engaging member, and wherein the urging part can slidingly contact the cam face.

29. A transfer tool according to claim 28, wherein the cam face is formed on the upper face of the floating engaging member and the urging part is provided at a position opposed to the cam face on the lower face of the transferred object supporter.

30. A transfer tool according to claim 28, wherein the cam face includes a positioning part for coming into contact with the urging part to position the floating engaging member in the releasing attitude when the operating lever is located at the end of the rotating range.

31. A transfer tool according to claim 22, wherein the operating lever includes an elastic member for accumulating an elastic repulsive force in a direction reverse to a rotating direction of the operating lever when the operating lever is rotated.

32. A transfer tool used when a transferring object is transferred on a transferred object comprising:

a transfer tool main unit having at least a transfer head capable of bringing the transferring object into contact with the transferred object, the transfer head having a transfer face which comes into contact with the transferred object and on which the transferring object is transferred on the transferred object at the time of the transfer of the transferring object, wherein, in a normal use state, the transferring object is transferred on the transferred object by bringing the transfer face into contact with the transferred object and moving the transfer face in a predetermined transfer direction;

a feeding mechanism for feeding the transferring object to the transferred object by a certain dimension through the transfer face in the state where the transfer face is stopped and pressed with respect to the transferred object; and a switching mechanism for selectively switching between a feeding state by the action of the feeding mechanism and the normal use state where the feeding state is released while holding the transfer face in contact with the transferred object.

* * * * *